US012591252B2

(12) United States Patent
Yoshikawa et al.

(10) Patent No.: US 12,591,252 B2
(45) Date of Patent: Mar. 31, 2026

(54) CONTROL SYSTEM, CONTROL METHOD, AND NON-TRANSITORY STORAGE MEDIUM

(71) Applicant: TOYOTA JIDOSHA KABUSHIKI KAISHA, Toyota (JP)

(72) Inventors: Kei Yoshikawa, Nagoya (JP); Shiro Oda, Anjo (JP); Takeshi Matsui, Nissin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 141 days.

(21) Appl. No.: 18/588,389

(22) Filed: Feb. 27, 2024

(65) Prior Publication Data

US 2024/0353855 A1 Oct. 24, 2024

(30) Foreign Application Priority Data

Apr. 19, 2023 (JP) ................................. 2023-068270

(51) Int. Cl.
*G05D 1/249* (2024.01)
*G05D 1/644* (2024.01)
*G05D 107/60* (2024.01)
*G05D 109/10* (2024.01)
*G05D 111/10* (2024.01)

(52) U.S. Cl.
CPC ............. *G05D 1/249* (2024.01); *G05D 1/644* (2024.01); *G05D 2107/60* (2024.01); *G05D 2109/10* (2024.01); *G05D 2111/10* (2024.01)

(58) Field of Classification Search
CPC ........ B25J 9/1602; B25J 9/161; B25J 9/1664; B25J 9/1697; B25J 13/00; G05D 1/249; G05D 1/43; G05D 1/242; G05D 1/661; G05D 2105/30; G05D 1/633; G05D 1/648; G05D 1/644; G05D 2107/60; G05D 2109/10; G05D 1/2435; G05D 1/246; G05D 2111/10; G06V 20/52; G06V 20/56; H04N 7/181; H04N 23/695; H04N 23/90; H04N 7/18
See application file for complete search history.

(56) References Cited

U.S. PATENT DOCUMENTS

2021/0157318 A1* 5/2021 Takai ................... G05D 1/0223
2022/0250250 A1 8/2022 Oda et al.

FOREIGN PATENT DOCUMENTS

JP 2022-121820 A 8/2022
WO 2021001987 A1 1/2021

* cited by examiner

*Primary Examiner* — Calvin Cheung
(74) *Attorney, Agent, or Firm* — OLIFF PLC

(57) ABSTRACT

A control system that is configured to control a system including a mobile robot configured to autonomously move and a plurality of cameras installed in a facility includes one or more processors. The one or more processors are configured to execute a decision process of deciding a camera to be used with at least one of a predetermined usage condition and a predetermined usage load from among the cameras in accordance with a scheduled traveling route of the mobile robot.

5 Claims, 11 Drawing Sheets

| CATEGORY | | COLOR OF CLOTHING |
|---|---|---|
| NON-STAFF | | CANNOT BE SPECIFIED |
| STAFF | PHARMACIST | YELLOW |
| | NURSE | VIOLET |
| | ⋮ | ⋮ |

1

CONTROL SYSTEM, CONTROL METHOD, AND NON-TRANSITORY STORAGE MEDIUM

CROSS-REFERENCE TO RELATED APPLICATION

This application claims priority to Japanese Patent Application No. 2023-068270 filed on Apr. 19, 2023, incorporated herein by reference in its entirety.

BACKGROUND

1. Technical Field

The present disclosure relates to a control system, a control method, and a non-transitory storage medium.

2. Description of Related Art

Japanese Unexamined Patent Application Publication No. 2022-121820 (JP 2022-121820 A) discloses a robot control system that increases an amount of information obtained from a captured video of an imaging device in a case where entry of a mobile robot into a predetermined area corresponding to a blind spot area that is a blind spot for the mobile robot is detected.

SUMMARY

Incidentally, in a case where the mobile robot is monitored based on an image captured by a camera installed in a facility in which the mobile robot is practically used, more efficient selection of a usage state of the camera is desired for power saving. Such a selection cannot be realized by the technique described in JP 2022-121820 A.

The present disclosure provides a control system, a control method, and a non-transitory storage medium that can efficiently select a usage state of a camera for power saving in a case where a mobile robot that can autonomously move is monitored based on an image captured by a camera installed in a facility in which the mobile robot is practically used.

A first aspect of the present disclosure relates to a control system configured to control a system including a mobile robot configured to autonomously move and a plurality of cameras installed in a facility. The control system includes one or more processors. The one or more processors are configured to execute a decision process of deciding a camera to be used with at least one of a predetermined usage condition and a predetermined usage load from among the cameras in accordance with a scheduled traveling route of the mobile robot. With such a configuration, the control system enables efficient selection of the usage state of the camera for power saving in a case where the mobile robot that can autonomously move is monitored based on the image captured by the camera installed in the facility in which the mobile robot is practically used. In control of the autonomous movement, the mobile robot can also be caused to autonomously move by using a learning model obtained by machine learning.

In the first aspect of the present disclosure, the one or more processors may be configured to execute, as the decision process, at least one of a first decision process of deciding a camera to be in operation from among the cameras in accordance with the scheduled traveling route of the mobile robot, a second decision process of deciding a camera to be in operation and to be used as an information source from among the cameras in accordance with the scheduled traveling route of the mobile robot, and a third decision process of deciding a camera to be in operation and to be used as an information source in a state where the camera is operated with a higher load than another camera from among the cameras in accordance with the scheduled traveling route of the mobile robot. With such a configuration, the control system enables efficient selection of at least one of the camera to be in operation, the camera to be used as the information source, and the camera to be used as the information source in a state where the camera is operated with a high load for power saving, in a case where the mobile robot that can autonomously move is monitored based on the image captured by the camera installed in the facility in which the mobile robot is practically used.

In the first aspect of the present disclosure, the one or more processors may be configured to, in the first decision process, decide the camera to be in operation from among the cameras in accordance with the scheduled traveling route of the mobile robot and a positional relationship between a current position of the mobile robot and the cameras. The one or more processors may be configured to, in the second decision process, decide the camera to be in operation and to be used as the information source from among the cameras in accordance with the scheduled traveling route of the mobile robot and a positional relationship between a current position of the mobile robot and the cameras. The one or more processors may be configured to, in the third decision process, decide the camera to be in operation and to be used as the information source in a state where the camera is operated with a higher load than another camera from among the cameras in accordance with the scheduled traveling route of the mobile robot and a positional relationship between a current position of the mobile robot and the cameras. With such a configuration, the control system enables selection of the usage state of the camera also in consideration of the current position of the mobile robot with respect to the camera, so that power saving can be achieved more efficiently.

In the first aspect of the present disclosure, the one or more processors may be configured to execute at least one of the first decision process and the second decision process. The one or more processors may be configured to, in the first decision process, decide an imaging range of an image needed for traveling of the mobile robot in accordance with the scheduled traveling route and the positional relationship, and decide the camera to be in operation from among the cameras based on the imaging range. The one or more processors may be configured to, in the second decision process, decide an imaging range of an image needed for traveling of the mobile robot in accordance with the scheduled traveling route and the positional relationship, and decide the camera to be in operation and to be used as the information source from among the cameras based on the imaging range. With such a configuration, the control system decides at least one of the camera to be in operation and the camera to be used as the information source based on the imaging range of the image needed for the traveling of the mobile robot, so that power saving can be achieved more efficiently.

In the first aspect of the present disclosure, the one or more processors may be configured to execute the third decision process. The one or more processors may be configured to, in the third decision process, decide an imaging range of an image needed for traveling of the mobile robot in accordance with the scheduled traveling route and the positional relationship, and decide the camera to be in operation and to be used as the information source in a state where the camera is operated with a higher load than another camera from among the cameras based on the imaging range. With such a configuration, the control system decides the camera to be used as the information source in a state where the mobile robot is operated with a high load based on the imaging range of the image needed for the traveling of the mobile robot, so that power saving can be achieved more efficiently.

In the first aspect of the present disclosure, the one or more processors may be configured to execute one process of the first decision process, the second decision process, and the third decision process. The one or more processors may be configured to, in the first decision process, in a case where the scheduled traveling route and the positional relationship indicate that the mobile robot is scheduled to enter a predetermined area corresponding to a blind spot area that is a blind spot for the mobile robot, decide a camera disposed in the predetermined area among the cameras, as the camera to be in operation. The one or more processors may be configured to, in the second decision process, in a case where the scheduled traveling route and the positional relationship indicate that the mobile robot is scheduled to enter a predetermined area corresponding to a blind spot area that is a blind spot for the mobile robot, decide a camera disposed in the predetermined area among the cameras, as the camera to be in operation and to be used as the information source. The one or more processors may be configured to, in the third decision process, in a case where the scheduled traveling route and the positional relationship indicate that the mobile robot is scheduled to enter a predetermined area corresponding to a blind spot area that is a blind spot for the mobile robot, decide a camera disposed in the predetermined area among the cameras, as the camera to be in operation and to be used as the information source in a state where the camera is operated with a higher load than another camera. With such a configuration, in a case where the mobile robot is scheduled to enter the blind spot area, the control system decides that the camera disposed in the blind spot area is to be used, so that power saving can be achieved more efficiently.

In the first aspect of the present disclosure, the one or more processors may be further configured to execute a group classification process of recognizing a feature of a mobile body imaged by the camera to classify the mobile body into a first group and a second group that are set in advance, based on the feature. The one or more processors may be configured to execute the decision process in a case where the mobile body belonging to the first group does not exist. With such a configuration, the control system enables achievement of power saving in a case where the mobile body belonging to the first group does not exist, so that power saving can be achieved more efficiently.

A second aspect of the present disclosure relates to a control method of controlling a system including a mobile robot configured to autonomously move and a plurality of cameras installed in a facility. The control method includes executing a decision process of deciding a camera to be used with at least one of a predetermined usage condition and a predetermined usage load from among the cameras in accordance with a scheduled traveling route of the mobile robot. With such a configuration, the control method enables efficient selection of the usage state of the camera for power saving in a case where the mobile robot that can autonomously move is monitored based on the image captured by the camera installed in the facility in which the mobile robot is practically used.

In the second aspect of the present disclosure, the decision process may include at least one of a first decision process of deciding a camera to be in operation from among the cameras in accordance with the scheduled traveling route of the mobile robot, a second decision process of deciding a camera to be in operation and to be used as an information source from among the cameras in accordance with the scheduled traveling route of the mobile robot, and a third decision process of deciding a camera to be in operation and to be used as an information source in a state where the camera is operated with a higher load than another camera from among the cameras in accordance with the scheduled traveling route of the mobile robot. With such a configuration, the control method enables efficient selection of at least one of the camera to be in operation, the camera to be used as the information source, and the camera to be used as the information source in a state where the camera is operated with a high load for power saving, in a case where the mobile robot that can autonomously move is monitored based on the image captured by the camera installed in the facility in which the mobile robot is practically used.

In the second aspect of the present disclosure, the first decision process may be a step of deciding the camera to be in operation from among the cameras in accordance with the scheduled traveling route of the mobile robot and a positional relationship between a current position of the mobile robot and the cameras. The second decision process may be a step of deciding the camera to be in operation and to be used as the information source from among the cameras in accordance with the scheduled traveling route of the mobile robot and a positional relationship between a current position of the mobile robot and the cameras. The third decision process may be a step of deciding the camera to be in operation and to be used as the information source in a state where the camera is operated with a higher load than another camera from among the cameras in accordance with the scheduled traveling route of the mobile robot and a positional relationship between a current position of the mobile robot and the cameras. With such a configuration, the control method enables selection of the usage state of the camera also in consideration of the current position of the mobile robot with respect to the camera, so that power saving can be achieved more efficiently.

In the second aspect of the present disclosure, the decision process may include at least one of the first decision process and the second decision process. The first decision process may be a step of deciding an imaging range of an image needed for traveling of the mobile robot in accordance with the scheduled traveling route and the positional relationship, and deciding the camera to be in operation from among the cameras based on the imaging range. The second decision process may be a step of deciding an imaging range of an image needed for traveling of the mobile robot in accordance with the scheduled traveling route and the positional relationship, and deciding the camera to be in operation and to be used as the information source from among the cameras based on the imaging range. With such a configuration, in the control method, at least one of the camera to be in operation and the camera to be used as the information source is decided based on the imaging range of the image needed for the traveling of the mobile robot, so that power saving can be achieved more efficiently.

In the second aspect of the present disclosure, the decision process may include the third decision process. The third decision process may be a step of deciding an imaging range of an image needed for traveling of the mobile robot in accordance with the scheduled traveling route and the positional relationship, and deciding the camera to be in operation and to be used as the information source in a state where the camera is operated with a higher load than another camera from among the cameras based on the imaging range. With such a configuration, in the control method, the camera to be used as the information source in a state where the mobile robot is operated with a high load is decided based on the imaging range of the image needed for the traveling of the mobile robot, so that power saving can be achieved more efficiently.

In the second aspect of the present disclosure, the decision process may be one process of the first decision process, the second decision process, and the third decision process. The first decision process may be a step of, in a case where the scheduled traveling route and the positional relationship indicate that the mobile robot is scheduled to enter a predetermined area corresponding to a blind spot area that is a blind spot for the mobile robot, deciding a camera disposed in the predetermined area among the cameras, as the camera to be in operation. The second decision process may be a step of, in a case where the scheduled traveling route and positional relationship indicate that the mobile robot is scheduled to enter a predetermined area corresponding to a blind spot area that is a blind spot for the mobile robot, deciding a camera disposed in the predetermined area among the cameras, as the camera to be in operation and to be used as the information source. The third decision process may be a step of, in a case where the scheduled traveling route and the positional relationship indicate that the mobile robot is scheduled to enter a predetermined area corresponding to a blind spot area that is a blind spot for the mobile robot, deciding a camera disposed in the predetermined area among the cameras, as the camera to be in operation and to be used as the information source in a state where the camera is operated with a higher load than another camera. With such a configuration, in the control method, in a case where the mobile robot is scheduled to enter the blind spot area, the camera disposed in the blind spot area is decided to be used, so that power saving can be achieved more efficiently.

In the second aspect of the present disclosure, the control method may further include executing a group classification process of recognizing a feature of a mobile body imaged by the camera to classify the mobile body into a first group and a second group that are set in advance, based on the feature, in which the decision process is executed in a case where the mobile body belonging to the first group does not exist. With such a configuration, the control method enables achievement of power saving in a case where the mobile body belonging to the first group does not exist, so that power saving can be achieved more efficiently.

A third aspect of the present disclosure relates to a non-transitory storage medium storing instructions that are executable by one or more processors and that cause the one or more processors to execute a process of controlling a system including a mobile robot configured to autonomously move and a plurality of cameras installed in a facility. The process may include a decision process of deciding a camera to be used with at least one of a predetermined usage condition and a predetermined usage load from among the cameras in accordance with a scheduled traveling route of the mobile robot. With such a configuration, the non-transitory storage medium enables efficient selection of the usage state of the camera for power saving in a case where the mobile robot that can autonomously move is monitored based on the image captured by the camera installed in the facility in which the mobile robot is practically used.

In the third aspect of the present disclosure, the decision process may include at least one of a first decision process of deciding a camera to be in operation from among the cameras in accordance with the scheduled traveling route of the mobile robot, a second decision process of deciding a camera to be in operation and to be used as an information source from among the cameras in accordance with the scheduled traveling route of the mobile robot, and a third decision process of deciding a camera to be in operation and to be used as an information source in a state where the camera is operated with a higher load than another camera from among the cameras in accordance with the scheduled traveling route of the mobile robot. With such a configuration, the non-transitory storage medium enables efficient selection of at least one of the camera to be in operation, the camera to be used as the information source, and the camera to be used as the information source in a state where the camera is operated with a high load for power saving, in a case where the mobile robot that can autonomously move is monitored based on the image captured by the camera installed in the facility in which the mobile robot is practically used.

In the third aspect of the present disclosure, the first decision process may be a process of deciding the camera to be in operation from among the cameras in accordance with the scheduled traveling route of the mobile robot and a positional relationship between a current position of the mobile robot and the cameras. The second decision process may be a process of deciding the camera to be in operation and to be used as the information source from among the cameras in accordance with the scheduled traveling route of the mobile robot and a positional relationship between a current position of the mobile robot and the cameras. The third decision process may be a process of deciding the camera to be in operation and to be used as the information source in a state where the camera is operated with a higher load than another camera from among the cameras in accordance with the scheduled traveling route of the mobile robot and a positional relationship between a current position of the mobile robot and the cameras. With such a configuration, the non-transitory storage medium enables selection of the usage state of the camera also in consideration of the current position of the mobile robot with respect to the camera, so that power saving can be achieved more efficiently.

In the third aspect of the present disclosure, the decision process may include at least one of the first decision process and the second decision process. The first decision process may be a process of deciding an imaging range of an image needed for traveling of the mobile robot in accordance with the scheduled traveling route and the positional relationship, and deciding the camera to be in operation from among the cameras based on the imaging range. The second decision process may be a process of deciding an imaging range of an image needed for traveling of the mobile robot in accordance with the scheduled traveling route and the positional relationship, and deciding the camera to be in operation and to be used as the information source from among the cameras based on the imaging range. With such a configuration, in the non-transitory storage medium, at least one of the camera to be in operation and the camera to be used as the information source is decided based on the imaging range of the image needed for the traveling of the mobile robot, so that power saving can be achieved more efficiently.

In the third aspect of the present disclosure, the decision process may include the third decision process. The third decision process may be a process of deciding an imaging range of an image needed for traveling of the mobile robot in accordance with the scheduled traveling route and the positional relationship, and deciding the camera to be in operation and to be used as the information source in a state where the camera is operated with a higher load than another camera from among the cameras based on the imaging range. With such a configuration, in the non-transitory storage medium, the camera to be used as the information source in a state where the mobile robot is operated with a high load is decided based on the imaging range of the image needed for the traveling of the mobile robot, so that power saving can be achieved more efficiently.

In the third aspect of the present disclosure, the decision process may be one process of the first decision process, the second decision process, and the third decision process. The first decision process may be a process of, in a case where the scheduled traveling route and the positional relationship indicate that the mobile robot is scheduled to enter a predetermined area corresponding to a blind spot area that is a blind spot for the mobile robot, deciding a camera disposed in the predetermined area among the cameras, as the camera to be in operation. The second decision process may be a process of, in a case where the scheduled traveling route and the positional relationship indicate that the mobile robot is scheduled to enter a predetermined area corresponding to a blind spot area that is a blind spot for the mobile robot, deciding a camera disposed in the predetermined area among the cameras, as the camera to be in operation and to be used as the information source. The third decision process may be a process of, in a case where the scheduled traveling route and the positional relationship indicate that the mobile robot is scheduled to enter a predetermined area corresponding to a blind spot area that is a blind spot for the mobile robot, deciding a camera disposed in the predetermined area among the cameras, as the camera to be in operation and to be used as the information source in a state where the camera is operated with a higher load than another camera. With such a configuration, in the non-transitory storage medium, in a case where the mobile robot is scheduled to enter the blind spot area, the camera disposed in the blind spot area is decided to be used, so that power saving can be achieved more efficiently.

In the third aspect of the present disclosure, the process may include a group classification process of recognizing a feature of a mobile body imaged by the camera to classify the mobile body into a first group and a second group that are set in advance, based on the feature. The decision process may be a process executed in a case where the mobile body belonging to the first group does not exist. With such a configuration, the non-transitory storage medium enables achievement of power saving in a case where the mobile body belonging to the first group does not exist, so that power saving can be achieved more efficiently.

The present disclosure can provide the control system, the control method, and the non-transitory storage medium that can efficiently select the usage state of the camera for power saving in a case where the mobile robot that can autonomously move is monitored based on the image captured by the camera installed in the facility in which the mobile robot is practically used.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein:

FIG. 7 is a diagram illustrating an example of classification of a staff and a non-staff applied in a third process example in the controller of FIG. 4;

DETAILED DESCRIPTION OF EMBODIMENTS

Hereinafter, the present disclosure will be described with an embodiment, but the present disclosure is not limited to the following embodiment. In addition, all of the configurations described in the embodiment are not always needed as means for solving the problem.

Embodiment

A control system according to the present embodiment executes system control of controlling a system including a mobile robot that autonomously moves and a plurality of cameras. The mobile robot can be configured to transport a transport object, and the description will be made below with such an example, but the mobile robot may be configured not to transport the transport object. In a case where the mobile robot is configured to transport the transport object, the mobile robot can also be referred to as a transport robot, and the system can be referred to as a transport system. All of the cameras are installed in a facility, and are hereinafter referred to as environment cameras. Here, the term "in a facility" is not limited to an inside of the facility, and encompasses a site of the facility.

In addition, the system illustrated by the transport system can be constructed as a system that enables direct wireless communication between the environment camera and the mobile robot. In a case of this example, the control system can indicate the mobile robot and the environment camera, or components of control systems provided in the mobile robot and the environment camera.

Further, the system can be provided with a server that can be connected to the mobile robot through wireless communication and can execute wired or wireless communication with the environment camera, and such an example will be described below. In a case of this example, the control system can indicate the mobile robot, the environment camera, and the server, or components of control systems provided in the mobile robot, the environment camera, and the server.

The server is a server that provides information for autonomous movement to a mobile robot 100, and will be described below as a host management device. Although an example in which the system is not provided with the host management device is not described in detail, one or both of the mobile robot and the environment camera just needs to share functions of the host management device described below.

Transport System

Figure 1:
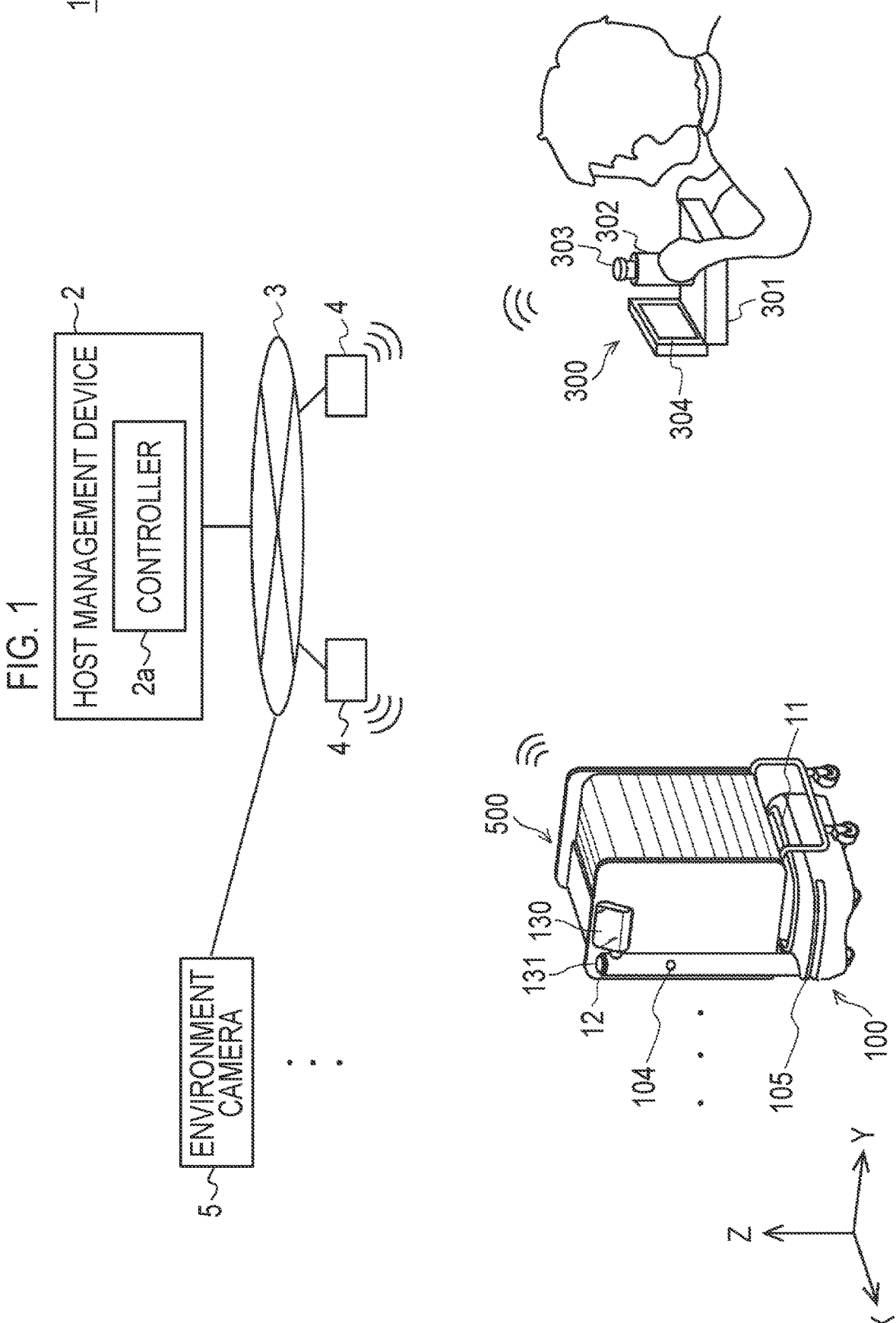
FIG. 1 is a schematic diagram illustrating an overall configuration example of a transport system according to an embodiment.

Hereinafter, a configuration example of the transport system will be described with reference to FIG. 1. FIG. 1 is a schematic diagram illustrating an overall configuration example of the transport system according to the present embodiment.

As illustrated in FIG. 1, the transport system 1 is provided with a mobile robot 100, a host management device 2, a network 3, a communication unit 4, an environment camera 5, and a user terminal device 300. The transport system 1 is a system that transports a transport object via the mobile robot 100, and includes a control system in the present configuration example. The control system in the present configuration example includes a controller 2a (described below) of the host management device 2.

In the following description, an XYZ orthogonal coordinate system will be used as appropriate for the description. An X direction is a front-rear direction of the mobile robot 100 illustrated in FIG. 1, a Y direction is a right-left direction, and a Z direction is a vertical up-down direction. More specifically, a +X direction is defined as a front direction of the mobile robot 100, and a –X direction is defined as a rear direction of the mobile robot 100. A +Y direction is a left direction of the mobile robot 100, and a –Y direction is a right direction of the mobile robot 100. A +Z direction is a vertical up direction, and a –Z direction is a vertical down direction.

The mobile robot 100 and the user terminal device 300 are connected to the host management device 2 through the communication unit 4 and the network 3. The network 3 is a wired or wireless local area network (LAN) or wide area network (WAN). Further, the host management device 2 and the environment camera 5 are connected to the network 3 through wired or wireless connection. As can be seen from such a configuration, all of the mobile robot 100, the host management device 2, and the environment camera 5 are provided with a communication unit. The communication unit 4 is, for example, a wireless LAN unit installed in each environment. The communication unit 4 may be, for example, a general-purpose communication device, such as a WiFi (registered trademark) router.

The host management device 2 is a device connectable to the mobile robot 100 through wireless communication, is a management system that manages a plurality of mobile robots 100, and can be provided with a controller 2a that executes control thereof. For example, the controller 2a can be realized by an integrated circuit, and can be realized by, for example, a processor, such as a micro processor unit (MPU) or a central processing unit (CPU), a work memory, and a non-transitory storage medium. A control program to be executed by the processor is stored in the non-transitory storage medium, and the processor can perform functions of the controller 2a by reading out the program into the work memory and executing the program. The controller 2a can be referred to as a control computer.

The transport system 1 can efficiently control the mobile robots 100 while causing the mobile robots 100 to autonomously move in a predetermined facility in an autonomous movement mode or causing the mobile robots 100 to move based on a user operation in a user operation mode. The facility can indicate various types of facilities, such as a medical care facility, such as a hospital, a rehabilitation center, a nursing care facility, or a residential facility for the elderly, a commercial facility, such as a hotel, a restaurant, an office building, an event venue, or a shopping mall, and other complex facilities. In addition, the user can be, for example, a worker at the facility in which the mobile robot 100 is practically used, and in a case where the facility is the hospital, the user can be a hospital staff including a hospital worker.

In order to execute such efficient control, a plurality of the environment cameras 5 can be installed in the facility. For example, the environment cameras 5 can be installed in a passage, a hole, an elevator, an entrance, and the like in the facility. The environment camera 5 can be used for monitoring a person, in addition to monitoring, or monitoring and controlling of the mobile robot 100.

The environment camera 5 acquires an image of a range in which the person or the mobile robot 100 moves, and outputs image data indicating the image. The image data may be still image data or moving image data, and in a case where the image data is the still image data, the still image data is obtained for each imaging interval. In addition, in the transport system 1, the host management device 2 collects the image acquired by the environment camera 5 or information based on the image. For an image used for controlling the mobile robot 100, an image acquired by the environment camera 5 or the like may be directly transmitted to the mobile robot 100, or may be transmitted to the user terminal device 300 through the host management device 2 or directly in the user operation mode. The environment camera 5 can be provided as a monitoring camera in the passage or the entrance in the facility.

The host management device 2 can decide the mobile robot 100 that executes a transport task for each transport request, to transmit an operation command for executing the transport task to the decided mobile robot 100. The mobile robot 100 can autonomously move from a transport source to arrive at a transport destination in accordance with the operation command. A method of deciding a transport route or the like in this case does not matter.

For example, the host management device 2 assigns the transport task to the mobile robot 100 at the transport source or in the vicinity of the transport source. Alternatively, the host management device 2 assigns the transport task to the mobile robot 100 moving toward the transport source or the vicinity of the transport source. The mobile robot 100 to which the task is assigned moves to the transport source to pick up the transport object.

Although a detailed example of the mobile robot 100 will be described below, the mobile robot 100 is an autonomous movement robot and can transport, for example, a wagon 500. Note that, as described above about the user operation mode, the mobile robot 100 can have a function of being movable by the operation of the user, that is, can be a mobile robot that can switch between the autonomous movement mode and the user operation mode. With the control of the autonomous movement, the mobile robot 100 can execute the autonomous movement based on the route decided or set in accordance with the set transport destination. In the control of the autonomous movement, the mobile robot 100 can also be caused to autonomously move by deciding the route or executing contact avoidance by using a learning model obtained by machine learning.

Here, the user operation mode in which the movement is executed based on the user operation just needs to be a mode in which a degree of involvement of the user operation is relatively high with respect to the autonomous movement mode in which the autonomous movement is executed. That is, the user operation mode does not have to be limited to a mode in which the user operates all of the motions of the mobile robot and eliminates all the autonomous control via the mobile robot, and similarly, the autonomous movement mode does not have to be limited to a mode in which full autonomous control is executed by the mobile robot and the operation of the user is not received at all. For example, the user operation mode and the autonomous movement mode may include first to third examples described below.

In the first example, in the autonomous movement mode, the mobile robot autonomously travels and determines whether to stop or start traveling without the operation of the user, and in the user operation mode, the mobile robot autonomously travels and the user executes operations of stopping and starting traveling. In the second example, in the autonomous movement mode, the mobile robot autonomously travels and the user executes the operation of stopping and starting traveling, and in the user operation mode, the mobile robot does not autonomously travel and the user executes a traveling operation in addition to the operations of stopping and starting traveling. In the third example, in the autonomous movement mode, the mobile robot autonomously travels and determines whether to stop or start traveling without the operation of the user, and in the user operation mode, the mobile robot autonomously travels for speed adjustment, contact avoidance, or the like and the user executes an operation, such as changing a traveling direction or the route.

The user terminal device 300 is a device that remotely operates the mobile robot 100 through the host management device 2 or directly in the user operation mode, can have a communication function for the remote operation, and can be provided with a display unit 304. As the user terminal device 300, for example, various types of terminal devices, such as a tablet computer and a smartphone, can be applied. In addition, the user terminal device 300 can also receive a switching operation of switching between the user operation mode and the autonomous movement mode, and in a case where the switching operation is executed, the mode switching of the mobile robot 100 can be executed through the host management device 2.

Here, an example in which the user terminal device 300 is provided with a joystick device will be described. The user terminal device 300 can be provided with a stick portion 302 and a button 303 as a part of a joystick device, in addition to a main body portion 301. The joystick device is a device that executes an operation of causing the mobile robot 100 to move in a direction intended by the user in the user operation mode. A direction operation can be received by tilting the stick portion 302 in a direction desired to move. In addition, the joystick device can also control to execute the switching operation of switching between the autonomous movement mode and the user operation mode, by pressing the button 303 downward. Alternatively, the joystick device can also control to execute a decision operation, by pressing the button 303 downward. In addition, the button 303 can also be configured to play a role of an emergency stop button by being pressed downward for a predetermined period. In a case of the configuration in which a plurality of operations of the switching operation, the decision operation, and the emergency stop operation can be received by the button 303, that is, in a case where a plurality of operation contents is assigned to the button 303, a predetermined period corresponding to each operation just needs to be set.

The display unit 304 can display an image indicated by image data received from a camera 104 in the mobile robot 100 and an image indicated by image data received from the environment camera 5 in the surrounding of the mobile robot 100. Therefore, the user can operate the mobile robot 100 by using the stick portion 302 and the button 303.

In addition, the user terminal device 300 can function as a device for making the transport request or the like with respect to the host management device 2. The transport request can also include information indicating the transport object, and can also include information indicating the transport destination.

Mobile Robot

Figure 2:
FIG. 2 is a perspective view illustrating an overall configuration example of a mobile robot in the transport system of FIG. 1.
Figure 2:
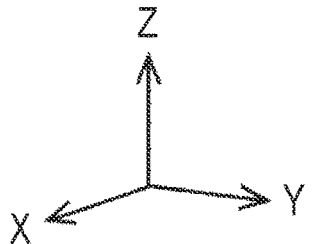

Next, a configuration example of the mobile robot 100 will be described with reference to FIG. 2. FIG. 2 is a perspective view illustrating an overall configuration example of the mobile robot 100 in the transport system 1.

As illustrated in FIGS. 1 and 2, the mobile robot 100 can be provided with a chassis 110 on which the transport object is mounted, a stand 120, and an operation unit 130. Wheels 111, an axle, a battery, a control computer 101, a drive motor, and the like are mounted on the chassis 110. The description will be made on the premise that the control computer 101 is mounted on the chassis 110 at a position illustrated in the drawing, but the present disclosure is not limited to this configuration, and the control computer 101 can also be mounted on the chassis 110 at another position, or a part or entirety of the control computer 101 can also be mounted at least one of the stand 120 and the operation unit 130.

The chassis 110 rotatably holds the wheels 111. In the example of FIG. 2, the chassis 110 is provided with four wheels 111. The four wheels 111 are right and left front wheels, and right and left rear wheels. Then, the mobile robot 100 moves by a desired route by independently controlling a rotation direction and a rotation speed of the wheels 111. A part of the four wheels 111 may be driving wheels, and the rest may be driven wheels. In addition, as illustrated in FIG. 2, an additional driven wheel can also be provided between the front and rear wheels 111 or the like. The mobile robot 100 can move in both of the front direction and the rear direction. That is, with the forward rotation of the wheels, the mobile robot 100 moves in the front direction, and with the reverse rotation of the wheels, the mobile robot 100 moves in the rear direction. The mobile robot 100 can turn right and left by changing the rotation speed of the right and left wheels.

Further, at least one of the chassis 110, the operation unit 130, and the stand 120 may be provided with, for example, various sensors, such as a camera and a distance measurement sensor, to prevent contact with an obstacle or to check the route.

FIGS. 1 and 2 illustrate an example in which, as the sensors, the camera 104 directed to a +X side is provided in the stand 120 and a sensor 105 is provided in a front portion of the chassis 110. A bumper is provided in the front portion of the chassis 110, and the sensor 105 can be disposed on the bumper and senses that an object comes into contact with the bumper. The mobile robot 100 can execute control of stopping the mobile robot 100 in a case where the sensor 105 senses the contact with the object, that is, the obstacle. Accordingly, the sensor 105 can be referred to as a stop sensor. Note that the sensor 105 is not limited to the sensor provided in the front portion, and can also be a sensor that is provided in a part or entirety of the outer periphery of the mobile robot 100, to sense the contact of the object with the bumper. In addition, the sensor 105 can also be configured to sense a position on the provided bumper with which the object comes into contact.

For example, the control computer 101 can be realized by an integrated circuit, and can be realized by, for example, a processor, such as an MPU or a CPU, a work memory, and a non-transitory storage medium. A control program to be executed by the processor is stored in the non-transitory storage medium, and the processor can perform a function of controlling the mobile robot 100 by reading out the program into the work memory and executing the program. The control computer 101 can be referred to as a controller.

The control computer 101 executes, based on map data stored in advance and information acquired by various sensors illustrated by the camera 104, autonomous movement control on the mobile robot 100 such that the mobile robot 100 moves toward the transport destination set in advance or along the transport route set in advance. The control computer 101 can receive the transport route or the transport destination from the host management device 2 to set the transport route or the transport destination. Then, the control computer 101 can control a driving unit, such as the wheels 111, to cause the mobile robot 100 to autonomously move along the transport route. In addition, the control computer 101 can also execute the autonomous movement control itself in accordance with a movement control signal transmitted from the host management device 2. In addition, the autonomous movement control can include control of mounting the wagon 500 illustrated in FIG. 3 or control of unloading the wagon 500. The wagon 500 will be described below. The control computer 101 can be provided with a movement controller that executes such autonomous movement control.

In order to load and unload the transport object, such as the wagon 500, the chassis 110 can be provided with a raising/lowering mechanism 140 for loading and unloading the transport object. The raising/lowering mechanism 140 can be partially accommodated inside the chassis 110 and can be disposed on an upper surface side of the chassis 110 in a state where a mounting surface for mounting the transport object is exposed. The raising/lowering mechanism 140 is a raising/lowering stage that can be raised and lowered, and can be raised and lowered in accordance with the control from the control computer 101. The chassis 110 is provided with a raising/lowering motor or a guide mechanism. An upper surface of the raising/lowering mechanism 140 is the mounting surface on which the wagon 500 as the transport object is mounted.

Figure 3:
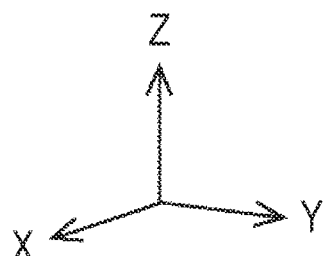
FIG. 3 is a perspective view illustrating an overall configuration example of a wagon transported by the mobile robot of FIG. 2.

The wagon 500 is not limited to the configuration illustrated in FIG. 3, and just needs to be a predetermined wagon having a size, a shape, and a weight with which the mounting on the raising/lowering mechanism 140 and the transport is possible. The raising/lowering mechanism 140 includes a lift mechanism that lifts the wagon 500. A space above the raising/lowering mechanism 140 serves as a mounting space on which the transport object is mounted. In a case where the practical use is limited to the loading of the wagon 500 via the user, the chassis 110 does not have to be provided with the raising/lowering mechanism 140.

In addition, the chassis 110 can be provided with a first light emission unit 11 at a position surrounding the raising/lowering mechanism 140. The first light emission unit 11 just needs to have a configuration in which light can be emitted and can be configured with, for example, one or more light-emitting diodes (LEDs) or an organic electroluminescence, and the light emission can be controlled by the control computer 101. In addition, a position, a shape, or a size of the first light emission unit 11 is not limited to the illustrated position, shape, or size. Even in a case where the raising/lowering mechanism 140 is not provided, the mobile robot 100 can be provided with the first light emission unit 11. The first light emission unit 11 and a second light emission unit 12 described below are merely given the prefixes "first" and "second" to distinguish the first light emission unit 11 and the second light emission unit 12 from each other.

The stand 120 is attached to the chassis 110. The stand 120 is a rod-shaped member extending upward from the chassis 110. Here, the stand 120 is formed in a cylindrical shape with the Z direction as a longitudinal direction, but of course, the shape does not matter, and a configuration in which the mobile robot 100 is not provided with the stand 120 may be adopted. The longitudinal direction of the stand 120 is provided to be parallel to the Z direction. The stand 120 is disposed outside the raising/lowering mechanism 140. That is, the stand 120 is disposed so as not to interfere with a raising/lowering operation of the raising/lowering mechanism 140. The stand 120 is disposed on one end side of the chassis 110 in the Y direction (right-left direction). The stand 120 is attached to the vicinity of a right front corner portion of the chassis 110. In an XY plane, the stand 120 is provided at an end portion of the chassis 110 on the +X side and a −Y side.

In addition, the stand 120 can be provided with, for example, a stick portion 131 of a joystick device or an emergency stop button for emergency stopping the mobile robot 100, on the upper surface portion. The joystick device is a device that executes an operation of causing the mobile robot 100 to move in a direction intended by the user in the user operation mode. The stick portion 131 can be gripped by the user with a hand and thus can be referred to as a grip portion. The user can tilt the stick portion 131 in a direction desired to move so a direction operation can be received. In addition, the joystick device can also control to execute the switching operation of switching between the autonomous movement mode and the user operation mode, by pressing the stick portion 131 downward. Alternatively, the joystick device can also control to execute the decision operation, by pressing the stick portion 131 downward. In addition, the stick portion 131 can also be configured to play a role of an emergency stop button by being pressed downward for a predetermined period. In a case of the configuration in which the plurality of operations of the switching operation, the decision operation, and the emergency stop operation can be received, the predetermined period just needs to be differentiated for each operation.

In addition, in a case where the user terminal device 300 is provided with the joystick device, the user can execute the same operation even in a case where the mobile robot 100 is not provided with the joystick device. The mobile robot 100 can also be provided with a button, such as the button 303, on an upper surface of the stick portion 131 or the like. In addition, in a configuration in which the transport system 1 manages the plurality of mobile robots 100, in the user operation mode, the mobile robot 100 that is a remote operation target can be selected from the user terminal device 300.

In addition, the stand 120 can be provided with the second light emission unit 12 at a position surrounding the stick portion 131. The second light emission unit 12 just needs to have a configuration in which light can be emitted and can be configured with, for example, one or more LEDs or an organic electroluminescence, and the light emission can be controlled by the control computer 101. In addition, a position, a shape, or a size of the second light emission unit 12 is not limited to the illustrated position, shape, or size. Even in a case where the stand 120 is not provided or in a case where the stand 120 is provided but the stick portion 131 is not provided, the mobile robot 100 can be provided with the second light emission unit 12.

The stand 120 supports the operation unit 130. The operation unit 130 is attached to the vicinity of an upper end of the stand 120. Therefore, the operation unit 130 can be installed at a height for the user to easily execute the operation. That is, the stand 120 extends to a height for the user in a standing state to easily execute the operation, and the stick portion 131 is also disposed at a height for the user to easily execute the operation. The operation unit 130 extends to a +Y side from the stand 120. In terms of easy operation, the operation unit 130 can be disposed in the center of the chassis 110 in the right-left direction.

The operation unit 130 can be provided with a touch panel monitor or the like that receives the operation of the user. Of course, the operation unit 130 can also be provided with a microphone or the like for voice input. The monitor of the operation unit 130 faces a side opposite to the chassis 110. That is, a display surface (operation surface) of the operation unit 130 is a surface on the +X side. The operation unit 130 may be detachably provided in the stand 120. That is, the stand 120 may be attached with a holder that holds a touch panel. The user can input the transport destination of the transport object, transport information on the transport object, or the like by operating the operation unit 130. Further, the operation unit 130 can display, to the user, information, such as the contents of the transport object being transported, the transport object scheduled to be transported, or the destination. Of course, the mobile robot 100 may have a configuration in which the operation unit 130 is not provided, but even in such a case, the mobile robot 100 can have a configuration in which the operation in the user operation mode is possible. For example, the mobile robot 100 may be provided with a device operated in the user operation mode, such as the joystick device, or may be connected to an operation device that executes the remote operation.

In addition, as illustrated in the drawing, the operation unit 130 and the stick portion 131 can be disposed at least at the same height such that the operation unit 130 and the stick portion 131 can be operated intuitively. Therefore, even in a case where a pressing operation with the stick portion 131 is assigned to an operation of deciding an operation content displayed on the operation unit 130, the user can execute the operation with an intuitive flow.

In addition, an integrated circuit (IC) card reader for the user to execute user authentication using an IC card or the like can be provided at a position in the stand 120 with the same height as the operation unit 130 or inside the operation unit 130. The mobile robot 100 does not have to have a user authentication function, but can block an operation caused by a third party's prank or the like in a case where the user authentication function is provided. The user authentication function is not limited to the function using the IC card, and a method of inputting user information and a password from the operation unit 130 may be adopted, but the time and effort of the user can be reduced or the infection is prevented by adopting a method using various short-range wireless communication techniques capable of executing non-contact authentication.

With respect to the mobile robot 100, the user can accommodate the transport object in the wagon 500 mounted on the mobile robot 100 and request the transport. Hereinafter, since the wagon 500 itself can also be referred to as the transport object, for convenience, the description will be made by referring the transport object accommodated in the wagon 500 as an article for distinction. The mobile robot 100 autonomously moves to the set destination and transports the wagon 500. That is, the mobile robot 100 executes the transport task for the wagon 500. In the following description, a location in which the wagon 500 is mounted will also be referred to as the transport source or a loading location, and a location to which the wagon 500 is delivered will also be referred to as the transport destination or the destination.

For example, the mobile robot 100 moves inside a general hospital having a plurality of clinical departments. The mobile robot 100 transports the article, such as equipment, a consumable, or a medical instrument, between the clinical departments. For example, the mobile robot 100 delivers the article from a nurse station of one clinical department to a nurse station of another clinical department. Alternatively, the mobile robot 100 delivers the article from a storage depository of the equipment or the medical instrument to the nurse station of the clinical department. In addition, the mobile robot 100 delivers medicine prepared in a medicine preparation department to the clinical department or a patient scheduled to use the medicine.

Examples of the article include the consumable, such as an agent and a bandage, and the equipment, such as a sample, an examination instrument, a medical instrument, hospital food, and stationery. Examples of the medical instrument include a sphygmomanometer, a transfusion pump, a syringe pump, a foot pump, a nurse call button, a bed exit sensor, a low-pressure continuous inhaler electrocardiogramonitor, a medicine injection controller, an enteral feeding pump, an artificial respirator, a cuff pressure meter, a touch sensor, an aspirator, a nebulizer, a pulse oximeter, an artificial ventilation device, an asepsis device, and an echocardiographic device. In addition, food, such as hospital food and examination food, may be transported. Further, the mobile robot 100 may transport a used device, a used tableware, and the like. In a case where the transport destinations are located on different floors, the mobile robot 100 may move by using an elevator or the like.

Wagon and Example of Holding Wagon

Next, the details of the wagon 500 and an example of holding the wagon 500 via the mobile robot 100 will be described with reference to FIGS. 3 and 1. FIG. 3 is a perspective view illustrating an overall configuration example of the wagon 500 transported by the mobile robot 100. FIG. 1 illustrates a state of the mobile robot 100 that transports the wagon 500, as a perspective view.

The wagon 500 is provided with an accommodation portion that accommodates the article and a support portion that supports the accommodation portion in a state where a space in which the entry of at least a part of the chassis 110 is allowed is formed on a lower side of the accommodation portion. As illustrated in FIG. 3, the accommodation portion can include side plates 504 on both sides of the wagon 500 and a cover 501 that can be opened and closed. When the user opens the cover 501, the user can load and unload the article accommodated inside the wagon 500. As illustrated in FIG. 3, the support portion can include a support frame 505 that supports the accommodation portion and wheels 502 attached to a lower side of the support frame 505. The wheels 502 can also be provided with covers (not illustrated).

As described above, the wagon 500 can be held by the raising/lowering mechanism 140 in the mobile robot 100. The raising/lowering mechanism 140 is a mechanism for loading and unloading the wagon 500 as the transport object on at least a part of the upper surface side of the chassis 110. Since the raising/lowering mechanism 140 is provided, the mobile robot 100 can easily automatically transport the wagon 500.

As illustrated in FIG. 1, the mobile robot 100 can hold the wagon 500 via the raising/lowering mechanism 140. The space in which the entry of at least a part of the chassis 110 is allowed is a space S formed on the lower side of the wagon 500 illustrated in FIG. 3, and this space S is a space in which the chassis 110 enters.

That is, the chassis 110 can enter the space S directly under the wagon 500. In a case where the wagon 500 is mounted on the chassis 110, the mobile robot 100 moves in the −X direction and enters directly under the wagon 500. The chassis 110 enters directly under the wagon 500 from a side on which the stand 120 is not provided in the front-rear direction. In this manner, the wagon 500 can be mounted without the stand 120 interfering with the wagon 500. Stated another way, the stand 120 can be attached to the vicinity of the corner portion of the chassis 110 so as not to interfere with the wagon 500.

In addition, as illustrated in FIG. 2, a recess portion 141 can be provided in the mounting surface of the raising/lowering mechanism 140. On the other hand, a protrusion portion (not illustrated) can be provided on the lower side of the accommodation portion of the wagon 500. Then, by fitting the protrusion portion into the recess portion 141, the wagon 500 can be fixed to the mobile robot 100.

Although the wagon 500 is illustrated as a trolley provided with the wheels 502, the shape or the configuration of the wagon 500 is not particularly limited. The predetermined wagon illustrated by the wagon 500 just needs to have a shape, a size, and a weight with which the transport via the mobile robot 100 is possible.

An operation of the mobile robot 100 loading the wagon 500, transporting the wagon 500 to the transport destination, and unloading the wagon 500 will be described. First, for the loading of the wagon 500, the mobile robot 100 can be a mobile robot for which the wagon 500 is set in advance as a transport target and that moves in search of the wagon 500 or to a known position. For example, the mobile robot 100 can also autonomously move for transporting the wagon 500 by designating the wagon 500 whose position is designated by the user, as the transport target or as a search target. Alternatively, the mobile robot 100 may automatically transport the wagon 500 to the transport destination in a case where the wagon 500 is found on a return route after the transport task of transporting another wagon or article is finished. Without limitation to these examples, various methods can be applied as a practical use method of transporting the wagon 500 via the mobile robot 100.

The mobile robot 100 moves to the position of the wagon 500, and the control computer 101 recognizes the wagon 500 based on the information acquired by the camera 104 or another sensor, and executes control of stacking the wagon 500 via the raising/lowering mechanism 140. The control of stacking can also be referred to as pick-up control.

In the pick-up control, first, the chassis 110 is allowed to enter the space S directly under the wagon 500, and the raising/lowering mechanism 140 is raised when the entry is completed. Therefore, the raising/lowering stage, as the upper surface of the raising/lowering mechanism 140, comes into contact with the wagon 500, and the raising/lowering mechanism 140 can lift the wagon 500. That is, when the raising/lowering mechanism 140 rises, the wheels 502 are separated from the ground, and the wagon 500 is mounted on the chassis 110. Therefore, the mobile robot 100 docks with the wagon 500 and is ready for moving toward the transport destination. Then, the control computer 101 transports the wagon 500 to the transport destination by controlling the driving of the wheels 111 or the like such that the autonomous movement is executed along the set route.

The mobile robot 100 moves to the transport destination of the wagon 500, and the control computer 101 executes control of unloading the wagon 500 via the raising/lowering mechanism 140. In this control, the raising/lowering mechanism 140 is lowered in order to unload the wagon 500 from the chassis 110. The wheels 502 come into contact with a floor surface, and the upper surface of the raising/lowering mechanism 140 is separated from the wagon 500. The wagon 500 is placed on the floor surface. The wagon 500 can be unloaded from the chassis 110.

In the various examples, the description is made on the premise that each of the mobile robots 100 transports the wagon, such as the wagon 500, as the transport object. Note that the mobile robot 100 may transport individual articles (packages) as the transport objects during practical use even in a configuration in which the wagon can be transported, or may be configured to solely transport individual articles. In any configuration, an accommodation box, a rack portion, or the like for preventing falling-off of the article during the movement may be attached to the mobile robot 100.

In addition, in terms of practical use, there may be a situation where a plurality of articles is transported by the mobile robot 100 and the articles need to be transported to a plurality of transport destinations. In this case, the user can unload the article at the transport destination regardless of whether or not the wagon 500 is used for transport. The mobile robot 100 can autonomously move to the set destination or move in accordance with the user operation, to transport the wagon or individual articles.

System Control

The control system in the present embodiment executes, as at least a part of the system control, a decision process of deciding the environment camera 5 to be used with at least one of a predetermined usage condition and a predetermined usage load from among the environment cameras 5 in accordance with a scheduled traveling route of the mobile robot 100. In the decision process, the environment camera 5 to be used in a usage form associated with at least one of the predetermined usage condition and the predetermined usage load is decided. The predetermined usage condition and the predetermined usage load can be arbitrarily determined. With such a configuration, the control system according to the present embodiment enables efficient selection of the usage state of the environment camera 5 for power saving in a case where the mobile robot 100 that can autonomously move is monitored based on the image captured by the environment camera 5 installed in the facility in which the mobile robot 100 is practically used.

Hereinafter, the description will be made on the premise that the decision process includes at least one of a first decision process, a second decision process, and a third decision process, but other processes may be used or other processes can also be included. The first decision process is a process of deciding the environment camera 5 to be in operation from among the environment cameras 5 in accordance with the scheduled traveling route of the mobile robot 100. In the first decision process, unlike the second decision process described below, the environment camera 5 to be in operation but not to be used as an information source is decided. The second decision process is a process of deciding the environment camera 5 to be in operation and to be used as the information source from among the environment cameras 5 in accordance with the scheduled traveling route of the mobile robot 100. The third decision process is a process of deciding the environment camera 5 to be in operation and to be used as the information source in a state where the environment camera 5 is operated with a higher load than the other environment cameras 5 from among the environment cameras 5 in accordance with the scheduled traveling route of the mobile robot 100.

All of the first decision process, the second decision process, and the third decision process are processes of deciding the usage state of the environment camera 5, and such an expression will also be used in the following description.

In addition, the environment camera 5 to be in operation can be put into, for example, a state where the environment camera 5 can be activated immediately after being operated in a sleep state. In addition, any of the environment cameras 5 can be provided with a sensor that senses a motion of the object via infrared rays or the like. By adopting such a configuration, the environment camera 5 to be in operation can be the environment camera 5 in which solely the sensor is to be in operation, and the environment camera 5 in this state just needs to also operate a camera function in a case where the motion of the object due to a person or the like passing close by is sensed.

The scheduled traveling route is a route that is described as the transport route and is set before traveling, and the scheduled traveling route generated by the host management device 2 can be used, but the scheduled traveling route can also be generated by the mobile robot 100, as described above. In addition, the decision process itself can be executed by the host management device 2, and the description will be made below with such an example, but the decision process can also be executed by the mobile robot 100. In a case where the mobile robot 100 generates the scheduled traveling route and the host management device 2 executes the decision process, the host management device 2 just needs to acquire the generated scheduled traveling route from the mobile robot 100.

With such a configuration, the transport system 1 enables efficient selection of the usage state of the environment camera 5 for power saving in accordance with the scheduled traveling route of the mobile robot 100 in a case where the mobile robot 100 that can autonomously move is monitored, or is monitored and controlled based on the image captured by the environment camera 5 installed in the facility in which the mobile robot 100 is practically used. The selection can also be executed by using the learning model obtained by the machine learning.

Configuration Example for System Control

Figure 4:
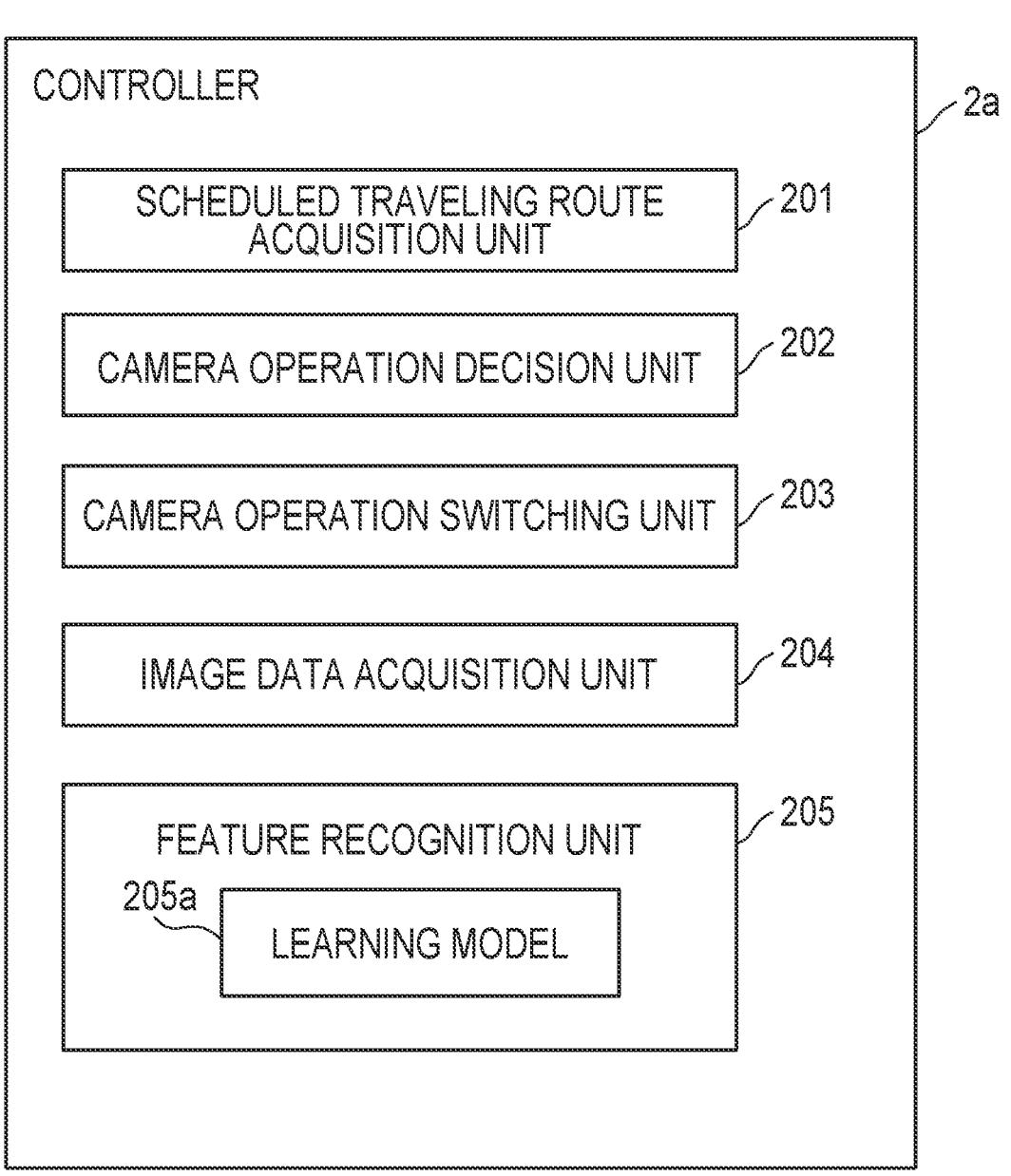
FIG. 4 is a block diagram illustrating a configuration example of a controller of a host management device in the transport system of FIG. 1.

Next, a configuration example for executing such system control will be described with reference to FIG. 4. FIG. 4 is a block diagram illustrating a configuration example of the controller 2a of the host management device 2.

As illustrated in FIG. 4, the controller 2a can be provided with a scheduled traveling route acquisition unit 201, a camera operation decision unit 202, and a camera operation switching unit 203. The controller 2a can be provided with an image data acquisition unit 204 and a feature recognition unit 205, but an example in which these configurations are provided will be described below as a third process example.

The scheduled traveling route acquisition unit 201 acquires the scheduled traveling route by reading out the scheduled traveling route of the mobile robot 100 from a storage unit (not illustrated) provided in the controller 2a. The scheduled traveling route is a transport route planned for the mobile robot 100, and for example, can include a scheduled position of the mobile robot 100 at predetermined time intervals or can include scheduled traveling time for each of a branch point or intersection on which the traveling is scheduled. The method of deciding the scheduled traveling route does not matter, as described above. In addition, in a configuration in which the transport system 1 plans the scheduled traveling route on the mobile robot 100 side, the scheduled traveling route acquisition unit 201 acquires the scheduled traveling route from the mobile robot 100.

The camera operation decision unit 202 decides the usage state of the environment camera 5 in accordance with the scheduled traveling route of the mobile robot 100 acquired by the scheduled traveling route acquisition unit 201. The decision can be executed as described as the decision process. That is, in a configuration in which the decision process includes the first decision process, the camera operation decision unit 202 decides the environment camera 5 to be in operation from among the environment cameras 5. In a configuration in which the decision process includes the second decision process, the camera operation decision unit 202 decides the environment camera 5 to be in operation and to be used as the information source from among the environment cameras 5. In a configuration in which the decision process includes the third decision process, the camera operation decision unit 202 decides the environment camera 5 to be in operation and to be used as the information source in a state where the environment camera 5 is operated with a higher load than the other environment cameras 5 from among the environment cameras 5.

For example, in a case where, as the first decision process, the camera operation decision unit 202 decides the environment camera 5 to be in operation, the camera operation decision unit 202 may decide the plurality of environment cameras 5 to be in operation. Similarly, in a case where, as the second decision process, the camera operation decision unit 202 decides the environment cameras 5 to be in operation and to be used as the information source, the camera operation decision unit 202 may decide the plurality of environment cameras 5 to be in operation and to be used as the information source. Similarly, in a case where, as the third decision process, the camera operation decision unit 202 decides the environment cameras 5 to be in operation and to be used as the information source in a state where the environment camera 5 is operated with a higher load than the other environment cameras 5, the camera operation decision unit 202 may decide the plurality of environment cameras 5 to be operated in such a manner.

As an example, the camera operation decision unit 202 can decide the usage state of each environment camera 5 such that the mobile robot 100 can be monitored for a scheduled traveling position of the mobile robot 100 at certain time indicated by the scheduled traveling route of the mobile robot 100. Here, a supplementary description of the usage state of the environment camera 5 will be made. Deciding the usage state of each environment camera 5 means to decide the usage state of each environment camera via the process in which the camera operation decision unit 202 executes the decision process among the first decision process, the second decision process, and the third decision process. Therefore, as an example, in a configuration in which the camera operation decision unit 202 executes the first decision process and the second decision process, deciding the usage state of each environment camera 5 means to decide the environment camera 5 to be in operation but not to be used as the information source and the environment camera 5 to be in operation and to be used as the information source, for each environment camera 5.

An example in which the usage state of each environment camera 5 is decided for the scheduled traveling position of the mobile robot 100 will be described. For example, the camera operation decision unit 202 can decide the usage state of each of the environment cameras 5 such that the mobile robot 100 can be monitored more precisely as a distance to the scheduled traveling position is decreased.

A more specific example of a case where the decision process includes the first decision process, the second decision process, and the third decision process will be described. For example, as the third decision process, the camera operation decision unit 202 decides to operate, with a high load, and use, as the information source, the environment camera 5 disposed at a position that covers, with reference to a position A at which the traveling is scheduled at certain time ta, a distance range B1 before and behind the position A by a first predetermined distance on the scheduled traveling route. Alternatively, as the third decision process, the camera operation decision unit 202 decides to operate, with a high load, and use, as the information source, the environment camera 5 disposed at a position that covers a traveling position range B2 at time before and after time ta by a first predetermined time.

In the decision, as the second decision process, the camera operation decision unit 202 decides to use, as the information source, the environment camera 5 disposed at a position that covers a distance range C1 farther from the position A by a second predetermined distance than the distance range B1. Alternatively, as the second decision process, the camera operation decision unit 202 decides to use, as the information source, the environment camera 5 disposed at a position that covers a traveling position range C2 at time before and after the traveling position range B2 by a second predetermined time.

Further, in the decision, as the first decision process, the camera operation decision unit 202 decides to operate the environment camera 5 disposed at a position that covers a distance range D1 farther from the position A by a third predetermined distance than the distance range C1. Alternatively, as the first decision process, the camera operation decision unit 202 decides to operate the environment camera 5 disposed at a position that covers a traveling position range D2 at time before and after the traveling position range C2 by a third predetermined time.

Further, in the decision, the camera operation decision unit 202 can decide not to operate the other environment cameras 5. The camera operation decision unit 202 can also decide not to operate a part of the environment cameras 5 disposed at the position that covers the distance range C1 or the traveling position range C2, to achieve further power saving. In addition, the camera operation decision unit 202 can also decide not to operate a part of the environment cameras 5 disposed at the position that covers the distance range D1 or the traveling position range D2, to achieve further power saving.

The specific example herein is an example focusing solely on the mobile robot 100 for the sake of simplicity of description, but in a case where the mobile robots 100 are scheduled to travel at the same time, the usage state of each environment camera 5 may be decided by taking the scheduled traveling route of each mobile robot 100 into consideration.

The camera operation switching unit 203 executes control of switching the operation state of each environment camera 5 such that the usage state decided by the camera operation decision unit 202 is obtained. The control can be control through the network 3.

In a case where the environment camera 5 is operated with a high load, the camera operation switching unit 203 may operate the environment camera 5, for example, such that at least one of a frame rate (imaging rate) and an imaging resolution is increased, as compared to a case where the environment camera 5 is not operated with a high load. In a case where the environment camera 5 is not operated, the camera operation switching unit 203 just needs to control the environment camera 5 to be powered off or to be in the sleep state. The sleep state in this case can indicate a state where, even in a case where the environment camera 5 is provided with the sensor that senses the motion of the object, the sensor is also not operated. Regardless of the control method for the power source of the camera, an existing remote power source control technique just needs to be applied.

In addition, in the first light emission unit 11 and the second light emission unit 12 of the mobile robot 100, for example, control of light emission with various light emission patterns in accordance with the state of the mobile robot 100 can be executed, and the light emission pattern can also be sensed by the environment camera 5.

The state of the mobile robot 100 can indicate, for example, a traveling state of the mobile robot 100, an operating state of the mobile robot 100, and a mode state indicating whether the mobile robot 100 is in the autonomous movement mode or the user operation mode. Of course, the state of the mobile robot 100 can also indicate one or two states of the traveling state, the operating state, and the mode state.

The traveling state can indicate, for example, whether or not a traveling abnormality related to a traveling environment, such as contact with a wall, of the mobile robot 100 occurs. The operating state can indicate whether or not some operating abnormalities occur in the mobile robot 100, or a place at which the operating abnormality occurs. The operating abnormality is an abnormality excluding an abnormality in the traveling state related to the traveling environment of the mobile robot 100, and can indicate various abnormalities of the mobile robot 100, such as a dead battery, an abnormality in the driving unit, and an abnormality in the wheels.

With such a configuration, in the transport system 1, for example, even in a case where the communication with the host management device 2 is disconnected, the host management device 2 can know the state of the mobile robot 100 via the environment camera 5 that operates at a needed place in consideration of power saving. Alternatively, even in a configuration in which the transport system 1 originally does not execute the wireless communication for the state of the mobile robot 100, the host management device 2 can know the state of the mobile robot 100 via the environment camera 5 that operates at the needed place in consideration of power saving.

In addition, in the transport system 1, even in a configuration in which the communication between the mobile robot 100 and the host management device 2 is not possible or the mobile robot 100 and the host management device 2 do not execute the wireless communication for the state of the mobile robot 100, the host management device 2 can execute a process in accordance with the sensed state of the mobile robot 100. For example, a certain user can be instructed to manually move, withdraw, or inspect the mobile robot 100, and the user who receives the instruction can execute the work in accordance with the instruction. For the monitoring, a camera mounted on a mobile robot that travels in the facility at the same time as the mobile robot 100 can also be used for monitoring.

First Process Example

Figure 5:
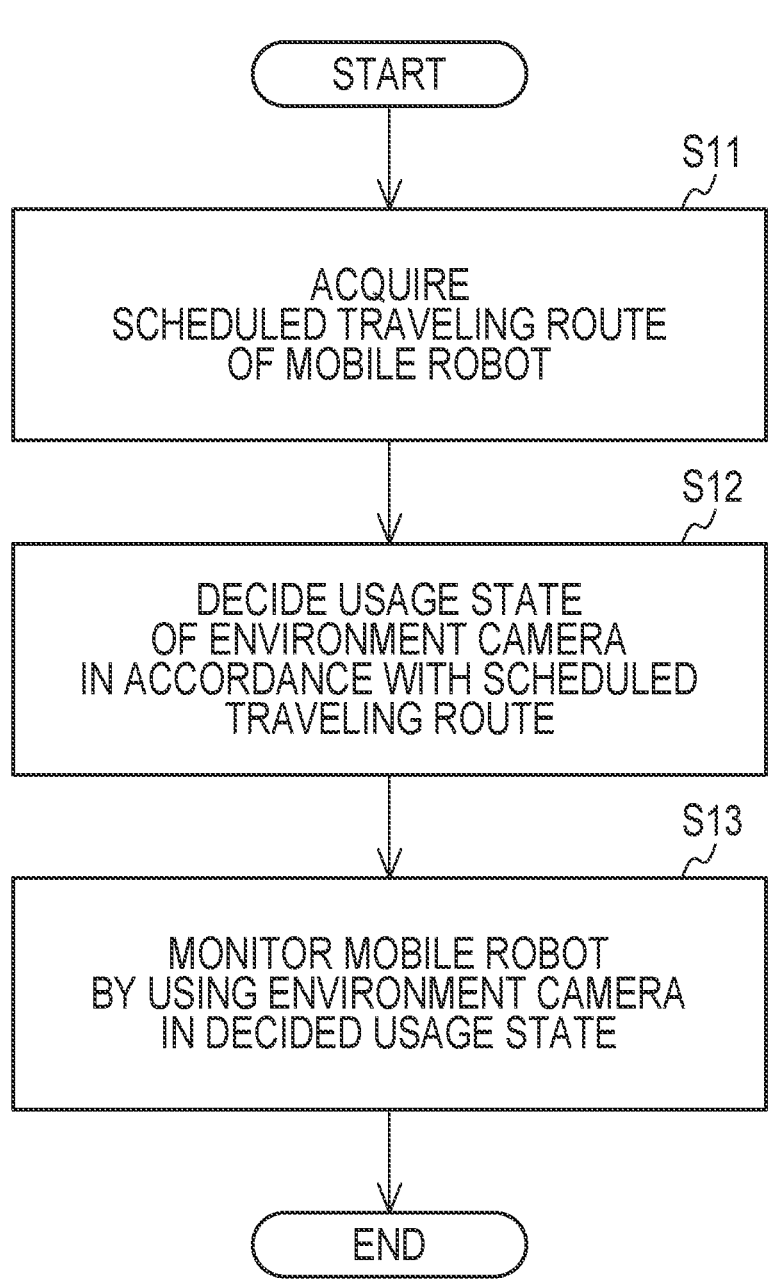
FIG. 5 is a flowchart for describing a first process example in the controller of FIG. 4.

A first process example of the system control will be described with reference to FIG. 5. FIG. 5 is a flowchart for describing the first process example in the controller 2a.

The controller 2a of the host management device 2 first acquires the scheduled traveling route of the mobile robot 100 (step S11). Then, the controller 2a decides the usage state of each environment camera 5 in accordance with the acquired scheduled traveling route (step S12). Then, the controller 2a controls the operation of each environment camera 5 to use each environment camera 5 in the decided usage state, and monitors the mobile robot 100 (step S13). An example of deciding the usage state or an example of controlling the operation of each of the environment cameras 5 is as described above in the configuration example for the system control.

The processes of steps S12 and S13 can also be executed, for example, for each predetermined time. Alternatively, the process of step S12 can be executed in advance for the scheduled traveling route related to one task of the mobile robot 100. In this case, the decision is executed in advance such that the usage state of each environment camera 5 is changed in time series in step S12, and in step S13, the operation of each environment camera 5 just needs to be sequentially controlled in accordance with the decision.

Second Process Example

A second process example of the system control will be described. In the second process example, as the decision process, the usage state of each environment camera 5 is decided in accordance with the scheduled traveling route of the mobile robot 100, and a positional relationship between a current position of the mobile robot 100 and the environment cameras 5 in the facility. The positional relationship indicates a relationship between positions of the environment cameras 5 with the current position of the mobile robot 100 as an origin, and can indicate a traveling distance in a case where the traveling is executed on the scheduled traveling route, a straight line distance, a predicted arrival time in a case where the traveling is executed on the scheduled traveling route, and the like.

In the second process example, unlike the first process example, the acquisition of the current position of the mobile robot 100 is needed. That is, the controller 2a in the second process example sequentially acquires the current position of the mobile robot 100. A method of acquiring the mobile robot 100 does not matter. For example, the controller 2a may calculate the current position of the mobile robot 100 based on the image captured by the environment camera 5 used in the current usage state. Alternatively, the controller 2a can also acquire the current position of the mobile robot 100 by obtaining, via the wireless communication, position information acquired by a position information acquisition unit (not illustrated) mounted on the mobile robot 100.

As an example, the camera operation decision unit 202 can decide the usage state of each environment camera 5 such that the mobile robot 100 can be monitored for the current position of the mobile robot 100. For example, the camera operation decision unit 202 can decide the usage state of each of the environment cameras 5 such that the mobile robot 100 can be monitored more precisely as a distance to the current position is decreased, for a route behind the current position on the scheduled traveling route.

A more specific example of a case where the decision process includes the first decision process, the second decision process, and the third decision process will be described. For example, as the third decision process, the camera operation decision unit 202 decides to operate, with a high load, and use, as the information source, the environment camera 5 disposed at a position that covers a distance range F1 from the current position to a fourth predetermined distance on the scheduled traveling route. Alternatively, as the third decision process, the camera operation decision unit 202 decides to operate, with a high load, and use, as the information source, the environment camera 5 disposed at a position that covers a range F2 to the traveling position at time after the current time by a fourth predetermined time.

In the decision, as the second decision process, the camera operation decision unit 202 decides to use, as the information source, the environment camera 5 disposed at a position that covers a distance range G1 farther from the current position by a fifth predetermined distance than the distance range F1. Alternatively, as the second decision process, the camera operation decision unit 202 decides to use, as the information source, the environment camera 5 disposed at a position that covers a range G2 to the traveling position at time after the range F2 by a fifth predetermined time.

Further, in the decision, as the first decision process, the camera operation decision unit 202 decides to operate the environment camera 5 disposed at a position that covers a distance range H1 farther from the current position by a sixth predetermined distance than the distance range G1. Alternatively, as the first decision process, the camera operation decision unit 202 decides to operate the environment camera 5 disposed at a position that covers a range H2 to the traveling position at time after the range G2 by a sixth predetermined time.

Further, in the decision, the camera operation decision unit 202 can decide not to operate the other environment cameras 5. The camera operation decision unit 202 can also decide not to operate a part of the environment cameras 5 disposed at the position that covers the distance range G1 or the range G2, to achieve further power saving. In addition, the camera operation decision unit 202 can also decide not to operate a part of the environment cameras 5 disposed at the position that covers the distance range H1 or the range H2, to achieve further power saving.

The specific example herein is also an example focusing solely on the mobile robot 100 for the sake of simplicity of description, but in a case where the plurality of mobile robots 100 are scheduled to travel at the same time, the usage state of each environment camera 5 may be decided by taking the scheduled traveling route of each mobile robot 100 into consideration.

The camera operation switching unit 203 executes control of switching the operation state of each environment camera 5 such that the usage state decided by the camera operation decision unit 202 is obtained.

Figure 6:
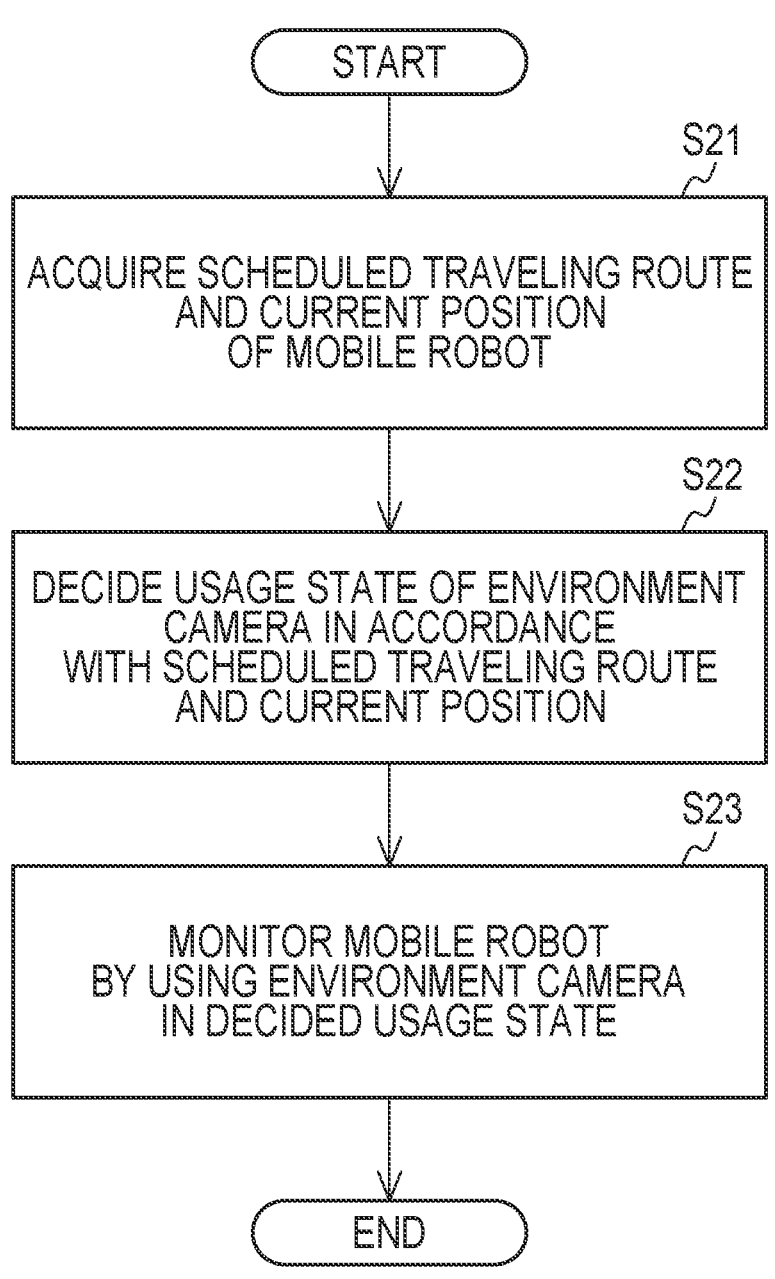
FIG. 6 is a flowchart for describing a second process example in the controller of FIG. 4.

Next, an example of a flow of the decision and the control as described above will be described with reference to FIG. 6. FIG. 6 is a flowchart for describing the second process example in the controller 2a of FIG. 4.

The controller 2a of the host management device 2 first acquires the scheduled traveling route and the current position of the mobile robot 100 (step S21). Then, the controller 2a decides the usage state of each environment camera 5 in accordance with the acquired scheduled traveling route and the current position (step S22). Then, the controller 2a controls the operation of each environment camera 5 to use each environment camera 5 in the decided usage state, and monitors the mobile robot 100 (step S23). The example of deciding the usage state or the example of controlling the operation of each of the environment cameras 5 is as described above.

The processes of steps S21 to S23 can be executed, for example, for each predetermined time, and in step S23, the operation of each environment camera 5 just needs to be sequentially controlled in accordance with the decision in step S22. Note that, for the scheduled traveling route of the mobile robot 100 in step S21, the scheduled traveling route related to one task of the mobile robot 100 just needs to be acquired once.

In the second process example, with respect to the first process example, the usage state of the environment camera 5 can be fluently selected also in consideration of the current position of the mobile robot 100 with respect to the environment camera 5, so that power saving can be achieved more efficiently.

Next, some application examples that can be applied to the second process example will be described. The camera operation decision unit 202 may decide an imaging range of an image needed for the traveling of the mobile robot 100 in accordance with the scheduled traveling route and the positional relationship, and decide at least one of the environment camera 5 to be in operation and the environment camera 5 to be used as the information source from among the environment cameras 5 in the facility based on the imaging range. That is, the decision process is at least one of the first decision process and the second decision process, and in the first decision process and the second decision process, the environment camera 5 to be in operation and the environment camera 5 to be in operation and to be used as the information source may be decided, respectively, based on the imaging range.

By applying this application example, the transport system 1 decides at least one of the environment camera 5 to be in operation and the environment camera 5 to be used as the information source based on the imaging range of the image needed for the traveling of the mobile robot 100, so that power saving can be achieved more efficiently.

In addition, the camera operation decision unit 202 can also decide an imaging direction or a zoom setting of each environment camera 5 to match the needed imaging range, in addition to the decision of at least one of the environment camera 5 to be in operation and the environment camera 5 to be used as the information source. In this case, the camera operation switching unit 203 can execute control of changing an orientation or the zoom setting of the environment camera 5 in accordance with the decision, and as a result, further power saving can be expected.

Alternatively, the camera operation decision unit 202 may decide the imaging range of the image needed for the traveling of the mobile robot 100 in accordance with the scheduled traveling route and the positional relationship, and decide the environment camera 5 to be operated with a higher load than the other environment cameras 5 from among the environment cameras 5 in the facility based on the imaging range. That is, the decision process is the third decision process, and in the third decision process, the environment camera 5 to be in operation and the environment camera 5 to be in operation and to be used as the information source in a state where the environment camera 5 is operated with a higher load than the other environment cameras 5 may be decided based on the imaging range.

By applying this application example, the transport system 1 decides the environment camera 5 to be operated with a high load based on the imaging range of the image needed for the traveling of the mobile robot 100, so that power saving can be achieved more efficiently. In addition, in this application example, the camera operation decision unit 202 may also decide the imaging direction and the zoom setting of each environment camera 5 to match the needed imaging range. In this case, the camera operation switching unit 203 can execute control of changing the orientation or the zoom setting of the environment camera 5 in accordance with the decision, and as a result, further power saving can be expected.

Alternatively, in a case where the scheduled traveling route and the positional relationship indicate that the mobile robot 100 is scheduled to enter a predetermined area corresponding to a blind spot area that is a blind spot for the mobile robot 100, the camera operation decision unit 202 can decide the usage state of each environment camera 5 as described below. That is, in a case where such a condition is satisfied, as the first decision process, the camera operation decision unit 202 can decide the environment camera 5 disposed in the predetermined area among the environment cameras 5 in the facility, as the environment camera 5 to be in operation. Alternatively, that is, in a case where such a condition is satisfied, as the second decision process, the camera operation decision unit 202 can decide the environment camera 5 disposed in the predetermined area among the environment cameras 5 in the facility, as the environment camera 5 to be used as the information source. Alternatively, that is, in a case where such a condition is satisfied, as the third decision process, the camera operation decision unit 202 can decide the environment camera 5 disposed in the predetermined area among the environment cameras 5 in the facility, as the environment camera 5 to be operated with a higher load than the other environment cameras 5. That is, the camera operation decision unit 202 can decide, for example, the environment camera 5 that can image the blind spot area that is the blind spot for the mobile robot 100 that is about to enter a corner or an intersection, as at least one of the environment camera 5 to be in operation, the environment camera 5 to be used as the information source, and the environment camera 5 to be operated with a higher load than the other environment cameras 5.

By applying this application example, the transport system 1 decides to use the environment camera 5 disposed in the blind spot area in a case where the mobile robot 100 is scheduled to enter the blind spot area, so that power saving can be achieved more efficiently.

In addition, for example, the image captured by the environment camera 5 that is decided in this way and of which the operation is controlled by the camera operation switching unit 203 is used for monitoring the mobile robot 100 via the host management device 2, and can also be used for controlling the mobile robot 100 as described below. That is, in a case where the obstacle is specified in the blind spot area that is the blind spot for the mobile robot 100 based on the image, the host management device 2 can control the mobile robot 100 to be temporarily stopped or decelerate, for example, before entering the blind spot area. Alternatively, the image can also be transmitted to the mobile robot 100 through the host management device 2 or the like. Then, in a case where the obstacle is specified in the blind spot area that is the blind spot for the mobile robot 100 based on the image, the mobile robot 100 can also be temporarily stopped or decelerate, for example, before entering the blind spot area.

Third Process Example

The third process example of the system control will be described with reference to FIG. 7. FIG. 7 is a diagram illustrating an example of classification of a staff and a non-staff applied in the third process example in the controller 2a of FIG. 4.

In the third process example, the control system in the transport system 1 executes a group classification process of recognizing a feature of a mobile body imaged by the environment camera 5, and classifying the mobile body into a first group and a second group that are set in advance, based on the recognized feature.

Here, the mobile body includes a person, and can also include another mobile robot of the same type or another mobile robot of the different type. The controller 2a can recognize the feature of the mobile body by analyzing the data of the image acquired from the environment camera 5. The feature of the mobile body can indicate, for example, a size of the mobile body and an attribute of the mobile body. For example, the attribute may be an attribute indicating a child or a person other than a child, an attribute indicating walking ability, such as whether or not a person is with a crutch, or an attribute indicating the staff or the non-staff.

Hereinafter, for the sake of simplicity of description, an example in which the first group is a group corresponding to the non-staff and the second group is a group corresponding to the staff will be described, but other classification methods can be applied as well.

In order to execute such a group classification process, for example, the controller 2a can be provided with the image data acquisition unit 204 and the feature recognition unit 205.

The image data acquisition unit 204 acquires the captured image data from the environment camera 5 currently used as at least the information source. In addition, the image data acquired by the image data acquisition unit 204 just needs to be the image data itself captured by the environment camera 5, but may be data obtained by processing the captured image data. For example, the image data may be data of a feature amount extracted from the image data. In addition, information, such as an imaging time or an imaging location, may be added to the image data. In addition, the image data acquisition unit 204 may acquire the image data from the plurality of environment cameras 5. The image data to be acquired can also include data of an image captured by a camera mounted on another mobile robot of the same type or another mobile robot of the different type.

The feature recognition unit 205 recognizes the feature of the mobile body based on the image data acquired by the image data acquisition unit 204. The feature recognition unit 205 can execute the recognition by extracting the feature of the mobile body from the image data and comparing the extracted feature with a predetermined feature. Accordingly, the feature recognition unit 205 can also be referred to as a feature extraction unit.

More specifically, the feature recognition unit 205 detects the mobile body included in the image data by executing image processing on the image data. Then, the feature recognition unit 205 extracts the feature of the mobile body, such as the person, included in the image data. In addition, an arithmetic processing unit (not illustrated) provided in the environment camera 5 that acquires the image data may execute at least a part of the process for the feature amount extraction. As means for detecting the inclusion of the mobile body, such as the person, in the image data, various techniques, such as histograms of oriented gradients (HOG) feature amount and machine learning including a convolution process, are known to those skilled in the art. Therefore, a detailed description thereof will be omitted here.

The feature recognition unit 205 detects, for example, a color of the clothing of the detected mobile body such that the staff and the non-staff can be distinguished from each other. Further specifically, for example, the feature recognition unit 205 can calculate a proportion of an area of a specific color from the clothing of the detected mobile body, actually from the clothing of a person detected by the existence of the clothing. Alternatively, the feature recognition unit 205 detects the color of the clothing in a specific part from the clothing of the detected person.

In this way, the feature recognition unit 205 can extract a characteristic part of the clothing of the staff, and can recognize that the feature indicates the staff in a case where the characteristic part can be extracted. On the other hand, in a case where the characteristic part of the clothing of the staff cannot be extracted, the feature recognition unit 205 can recognize that the feature indicates the non-staff. In this way, the feature recognition unit 205 can classify the mobile body into the first group illustrated by the non-staff group and the second group illustrated by the staff group.

As for whether the clothing is the staff's clothing or the non-staff's clothing, in a case where the colors of the clothing of "pharmacist" and "nurse" illustrated in FIG. 7 are detected, a determination is executed that the clothing is the staff's clothing, and in a case where the clothing of such colors cannot be detected, a determination is executed that the clothing is the non-staff's clothing. Actually, in a case of the hospital, the staff wears uniforms of different colors and shapes for each category, such as the pharmacist or the nurse, and thus the recognition of whether or not the person is the staff can be executed. Of course, without limitation to the color of the clothing, a characteristic shape of the clothing of the staff, such as the shape of the clothing or the hat, and the belongings of the staff, such as the characteristic accessories, may be extracted as the feature. Of course, the staff can include another mobile robot that moves in the facility, and in this case, the feature of the shape just needs to be extracted rather than the feature of the clothing.

In addition, the feature recognition unit 205 may extract a feature for face recognition from the image data and recognize the person by comparing the feature with a pre-registered face feature.

In addition, the feature recognition unit 205 can be provided with a learning model 205a that is a trained model. Specifically, the feature recognition unit 205 can also be configured to execute the classification by using the learning model 205a that inputs the image data and outputs whether or not the staff is included. In this case, for example, the machine learning can be executed with images captured for each category of the staff as teacher data. That is, by executing supervised learning with the image data to which the category of the staff is attached as a correct answer label as the teacher data, a machine learning model having high recognition precision can be constructed. That is, a captured image of the staff wearing a predetermined uniform can also be used as data for training. An algorithm or the like of the learning model 205a does not matter. In this way, the feature recognition unit 205 can execute the recognition of the feature and the classification based on the recognition, with high precision, by constructing the learning model 205*a* with good precision.

The feature recognition unit 205 supplies a classification result to the camera operation decision unit 202 regardless of which method the classification is executed by.

Then, the camera operation decision unit 202 in the third process example determines, based on the classification result, whether or not a case corresponds to a case where the mobile body belonging to the first group does not exist, in this case, whether or not a case corresponds to a case where the mobile body corresponding to the non-staff does not exist. That is, the camera operation decision unit 202 determines whether or not no mobile body exists in the range imaged by the environment camera 5 in the facility or whether or not there is solely the staff even in a case where the mobile body exists, based on the classification result.

The camera operation decision unit 202 decides the usage state of the environment camera 5 in a case where such a condition is satisfied. That is, the camera operation decision unit 202 executes the decision process in a case where such a condition is satisfied. For example, the camera operation decision unit 202 executes the first decision process and the second decision process as the decision process in a case where such a condition is satisfied. Note that, as a premise, in a case where such a condition is not satisfied, for example, all the environment cameras 5 may be operated with a high load using the maximum functions. Then, the camera operation switching unit 203 controls the usage state of each environment camera 5 to be put into the decided usage state of each environment camera 5.

Of course, the decision process based on the group classification process is not limited to such an example. For example, on the premise that at least one environment camera 5 is to be in operation and to be used as the information source, the camera operation decision unit 202 can also determine the condition based on the information source, and execute, in a case where the condition is satisfied, the first decision process, the second decision process, and the third decision process as the decision process. Even in a case where such a decision process is executed, the camera operation switching unit 203 controls the usage state of each environment camera 5 to be put into the decided usage state of each environment camera 5.

Figure 8:
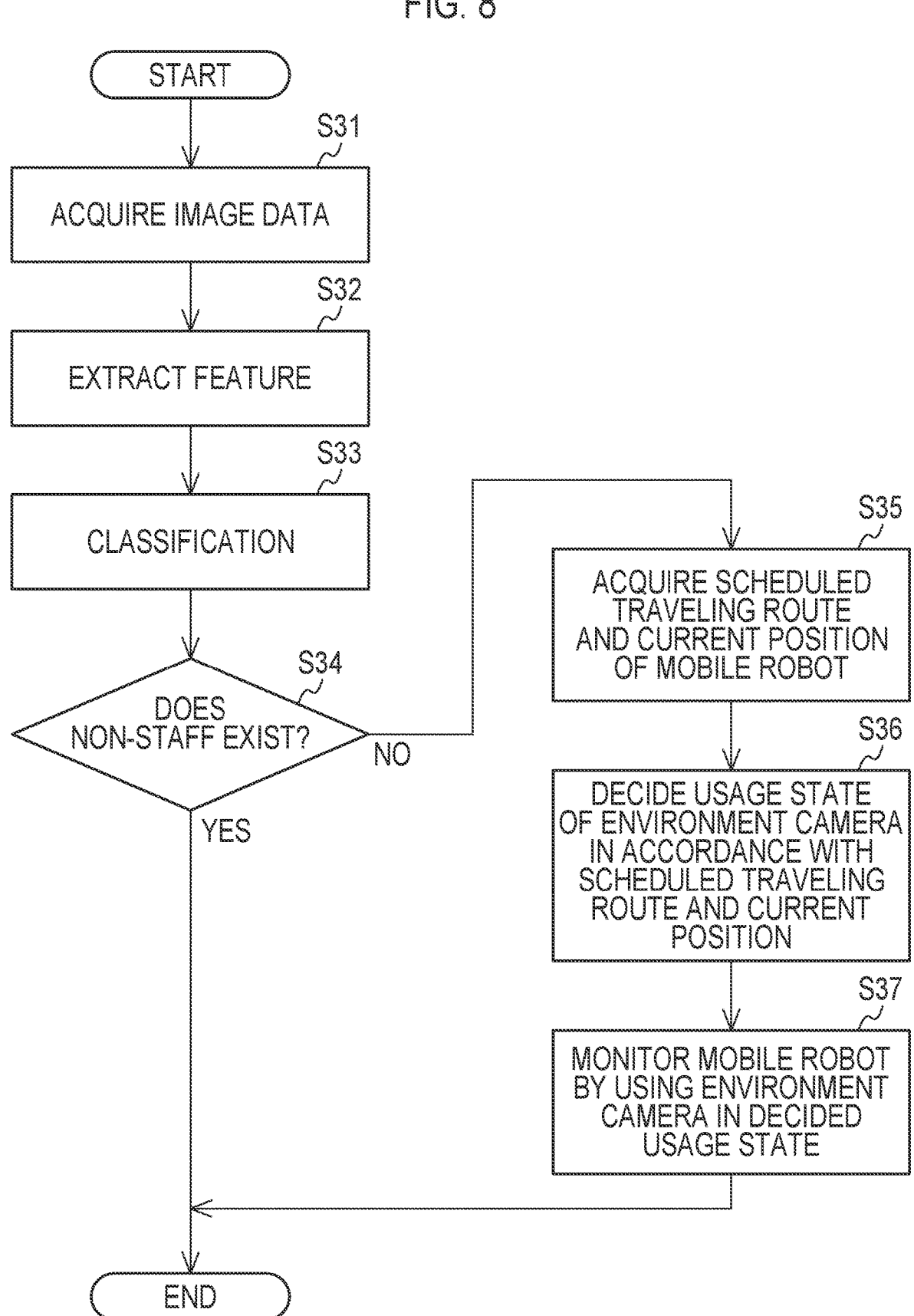
FIG. 8 is a flowchart for describing the third process example in the controller of FIG. 4.

Next, an example of a flow of the decision and the control as described above will be described with reference to FIG. 8. FIG. 8 is a flowchart for describing the third process example.

The controller 2*a* of the host management device 2 acquires the image data from the environment camera 5 currently set to be used as the information source (step S31), extracts the feature of the mobile body from the image data (step S32), and executes the classification of the mobile body in the image (step S33).

Then, the controller 2*a* determines whether or not the non-staff exists as the classification result (step S34), and in a case where the non-staff exists (in a case of YES), the controller 2*a* finishes the process while maintaining a state where all the environment cameras 5 are operated with a high load using the maximum functions, without change. On the other hand, in a case where the non-staff does not exist in step S34 (in a case of NO), the same process as the processes of steps S21 to S23 of FIG. 6, that is, the process of changing the usage state of each environment camera 5 for power saving is executed (steps S35 to S37), and the process is finished.

The processes of steps S31 to S37 can be executed, for example, for each predetermined time, and in a case where the non-staff does not exist, the operation of each environment camera 5 just needs to be sequentially controlled in accordance with the decision in step S36, in step S37. Note that, for the scheduled traveling route of the mobile robot 100 in step S35, the scheduled traveling route related to one task of the mobile robot 100 just needs to be acquired once. For example, the processes of steps S11 to S13 of FIG. 5 can also be executed instead of steps S35 to S37.

Figure 9:
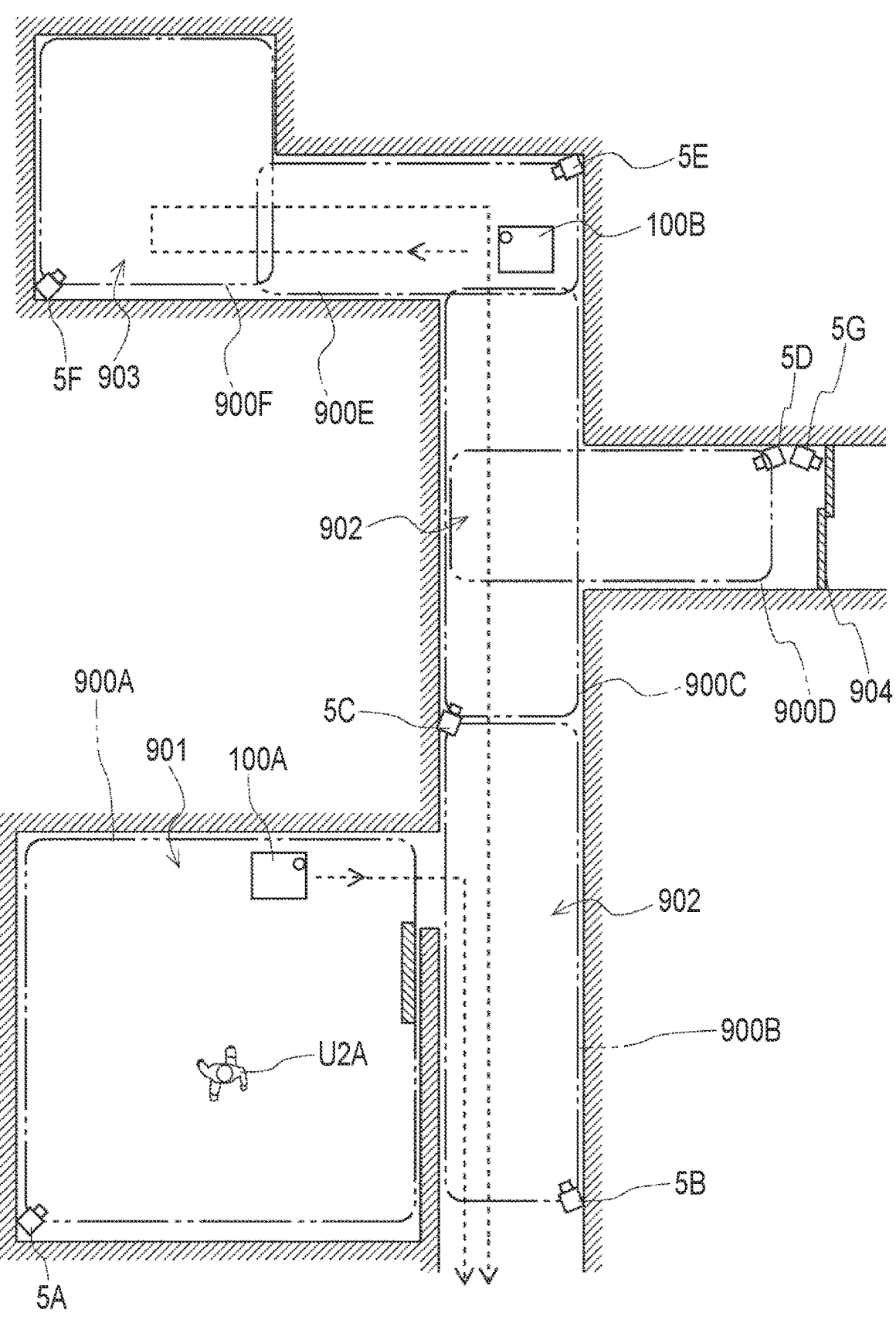
FIG. 9 is a schematic diagram illustrating an example of a position of the mobile robot, for describing the third process example of FIG. 8.
Figure 10:
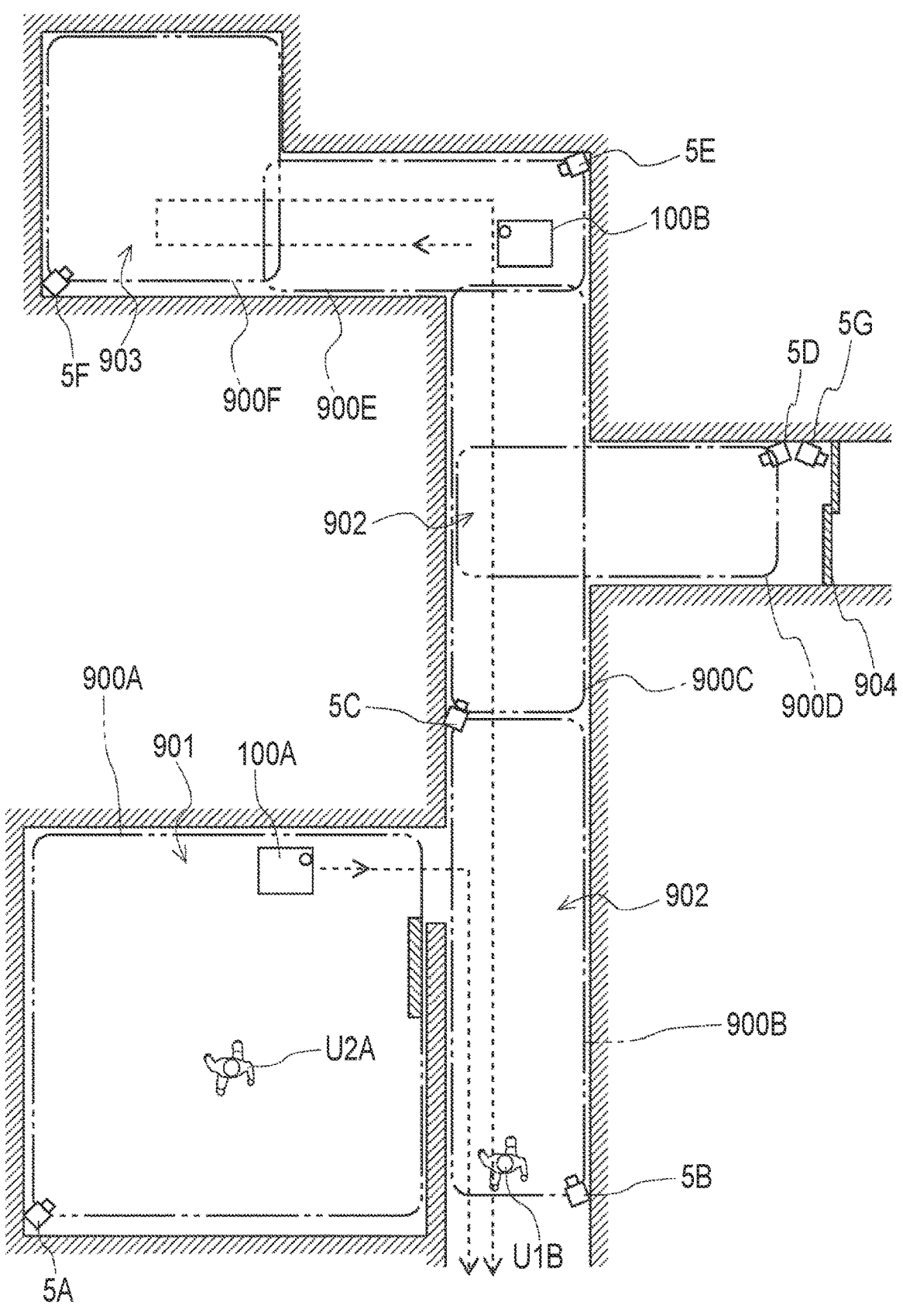
FIG. 10 is a schematic diagram illustrating an example of the position of the mobile robot, for describing the third process example of FIG. 8.

The third process example will be described with reference to FIGS. 9 and 10 and with a specific example of a floor of the facility on which the mobile robot 100 travels. FIGS. 9 and 10 are schematic diagrams illustrating examples of the position of the mobile robot, for describing the third process example of FIG. 8. FIGS. 9 and 10 schematically illustrate a state where the floor on which the mobile robot 100 moves is viewed from above.

As illustrated in FIG. 9, the facility is provided with a room 901, a room 903, and a passage 902. The passage 902 connects the room 901 and the room 903 to each other. In FIG. 9, seven environment cameras 5 are installed, and the description will be made by distinguishing the seven environment cameras 5 as environment cameras 5A to 5G. The environment cameras 5A to 5G are installed at different positions and different directions. The environment cameras 5A to 5G image different areas, and the environment camera 5G among the environment cameras 5A to 5G is disposed at a position at which the entrance and exit of the person at an entrance 904 functioning as a security gate can be checked. The positions, the imaging directions, the imaging ranges, and the like of the environment cameras 5A to 5G just needs to be stored in advance in a storage unit (not illustrated) so as to be referred to by the camera operation decision unit 202.

Areas assigned to the environment cameras 5A to 5F are monitoring areas 900A to 900F, respectively. For example, the environment camera 5A images the monitoring area 900A, and the environment camera 5B images the monitoring area 900B. Similarly, the environment cameras 5C, 5D, 5E, 5F image the monitoring areas 900C, 900D, 900E, 900F, respectively. The environment camera 5G images a range of the entrance 904. In this way, the environment cameras 5A to 5G are installed in the targeted facility. The facility is divided into a plurality of monitoring areas. Also, information on the monitoring area just needs to be stored in advance in the storage unit (not illustrated) so as to be referred to by the camera operation decision unit 202.

As in a situation illustrated in FIG. 9, in a case where there is solely a staff U2A in the facility, the controller 2*a* executes the process of changing the usage state of each of the environment cameras 5A to 5G for power saving. As an example, the description will be made assuming a situation where two mobile robots 100A, 100B as examples of the mobile robot 100 travel and each of the two mobile robots 100A, 100B follows the scheduled traveling route indicated by a broken line from the current time.

In this situation, the environment camera 5A is operated with a high load for monitoring the current position of the mobile robot 100A, and the environment camera 5B is operated to be used as the information source for future monitoring of the mobile robot 100A. In addition, in this situation, the environment camera 5E is operated with a high load for monitoring the current position of the mobile robot 100B, and the environment camera 5F is operated to be used as the information source for future monitoring of the mobile robot 100B. In this situation, the environment cameras 5C, 5D, 5G can be not to be in operation, but solely the environment camera 5G may be operated at least in preparation for the entrance of the person from the outside.

Thereafter, for example, in a case where the mobile robot 100A leaves the monitoring area 900A and moves to the passage 902 along the scheduled traveling route, the environment camera 5A may be not to be in operation and the environment camera 5B may be operated with a high load. In addition, in this case, in a case where the mobile robot 100B leaves the monitoring area 900E and moves to the room 903 along the scheduled traveling route, the environment camera 5F may be operated with a high load, and the environment camera 5E may be operated to be used as the information source for future monitoring. In this situation, other environment cameras 5C, 5D, 5G can be not to be in operation, but solely the environment camera 5G may be operated at least in preparation for the entrance of the person from the outside.

On the other hand, as in a situation illustrated in FIG. 10, in a case where there is a non-staff U1B in the facility (existence of the staff does not matter), the controller 2a does not execute the process of changing the usage state of each of the environment cameras 5A to 5G for power saving. That is, in this situation, the controller 2a maintains the state where all the environment cameras 5A to 5G are operated with a high load using the maximum functions.

As described above, in the third process example, power saving can be achieved in a case where the mobile body belonging to the first group does not exist, so that power saving can be achieved more efficiently. In particular, when the mobile robot is practically used in the facility, the facility is a space where an ordinary person and the staff of the facility coexist. Therefore, in a situation where a problem may potential occur, such as a situation where the non-staff exists, all the environment cameras 5 are operated with a high load using the maximum functions, thereby the possibility that the problem occurs can be reduced, and power saving can be achieved solely in other situations.

In addition, as an application example of the third process example, the feature recognition unit 205 may execute a classification process solely for the mobile body existing in the surrounding of the mobile robot 100 from the image data obtained by imaging the surrounding of the mobile robot 100. Even in this case, the camera operation decision unit 202 determines whether or not a case corresponds to a case where the mobile body corresponding to the non-staff does not exist in the surrounding of the mobile robot 100, and decide the usage state of the environment camera 5 in a case where such a condition is satisfied. As a premise, in a case where such a condition is not satisfied, for example, all the environment cameras 5 may be operated with a high load using the maximum functions. Then, the camera operation switching unit 203 controls the usage state of each environment camera 5 to be put into the decided usage state of each environment camera 5.

In addition, in the third process example, the classification into the first group and the second group is executed, and the usage states of the environment camera 5 are differentiated based on the classification result. However, the classification into three or more groups can be executed, and the usage states of the environment camera 5 can also be differentiated in three or more types in accordance with whether or not any one or a plurality of classified groups is included.

Alternative Example

The mobile robot 100, the user terminal device 300, the environment camera 5, and the like are not limited to the devices having the illustrated shape, and each device provided in the transport system 1, including these devices, is not limited to the device that executes the illustrated control, and just needs to perform the function of each device. In addition, the host management device 2 may be disposed in a distributed manner in a plurality of devices, as well as a physically single device. That is, the host management device 2 may be provided with a plurality of memories and a plurality of processors.

Figure 11:
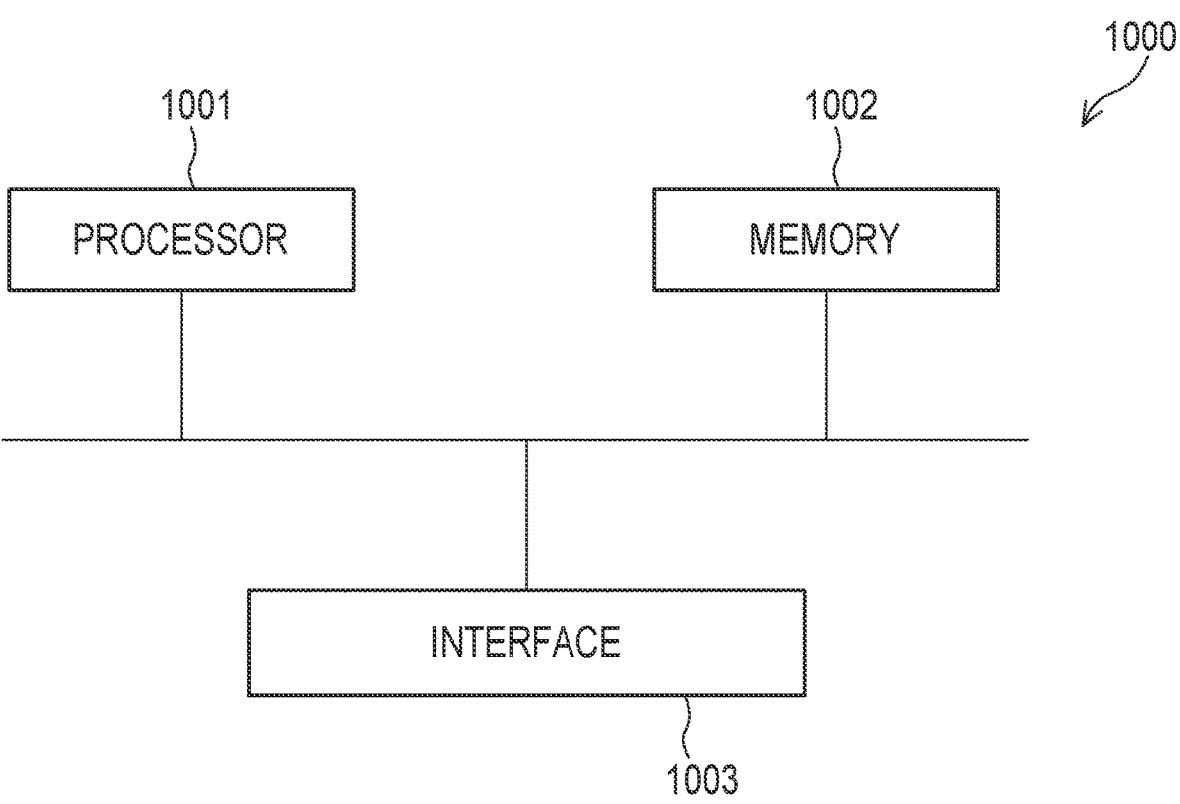
FIG. 11 is a diagram illustrating an example of a hardware configuration of a device.

In addition, each device provided in the transport system 1, such as the control computer 101 of the mobile robot 100, the host management device 2, or the user terminal device 300 according to the embodiment, or each device provided in the control system can have, for example, a hardware configuration described below. FIG. 11 is a diagram illustrating an example of the hardware configuration of the device.

A device 1000 illustrated in FIG. 11 can be provided with a processor 1001, a memory 1002, and an interface 1003. The interface 1003 can include, for example, a communication interface, an interface with a driving unit, a sensor, an input/output device, or the like that is needed depending on the device.

The processor 1001 may be, for example, an MPU, a CPU, or a graphics processing unit (GPU). The processor 1001 may include a plurality of processors. The memory 1002 is configured with, for example, a combination of a volatile memory and a non-volatile memory. The function of each device is realized by the processor 1001 reading the program stored in the memory 1002 and executing the program while exchanging needed information through the interface 1003.

In addition, the program includes an instruction group (or software code) for causing a computer to execute one or more functions described in the embodiment in a case where the program is read into the computer. The program may be stored on a non-transitory computer-readable medium or a tangible storage medium. Examples of the computer-readable medium or the tangible storage medium include a random-access memory (RAM), a read-only memory (ROM), a flash memory, a solid-state drive (SSD) or other memory technologies, a CD-ROM, a digital versatile disc (DVD), a Blu-ray (registered trademark) disc or other optical disc storages, and a magnetic cassette, a magnetic tape, a magnetic disk storage or other magnetic storage devices, but the computer-readable medium or the tangible storage medium is not limited to these examples. The program may be transmitted on a transitory computer-readable medium or a communication medium. Examples of the transitory computer-readable medium or the communication medium include electrical, optical, acoustic, or other forms of propagating signals, but the transitory computer-readable medium or the communication medium is not limited to these examples.

The present disclosure is not limited to the embodiment, and can be appropriately modified without departing from the spirit.

What is claimed is:

1. A non-transitory storage medium storing instructions that are executable by one or more processors and that cause the one or more processors to execute a process of controlling a system including a mobile robot configured to autonomously move and a plurality of cameras installed in a facility, wherein the process includes:

a decision process of deciding a camera to be used with at least one of a predetermined usage condition and a predetermined usage load from among the cameras in accordance with a scheduled traveling route of the mobile robot, wherein after the decision process includes at least one of:

a first controlling process of controlling a camera to be in operation from among the cameras in accordance with the scheduled traveling route of the mobile robot;

a second controlling process of controlling a camera to be in operation and to be used as an information source from among the cameras in accordance with the scheduled traveling route of the mobile robot; and a third controlling process of controlling a camera to be in operation and to be used as an information source in a state where the camera is operated with a higher load than another camera from among the cameras in accordance with the scheduled traveling route of the mobile robot.

2. The non-transitory storage medium according to claim 1, wherein:

the first controlling process is a process of controlling the camera to be in operation from among the cameras in accordance with the scheduled traveling route of the mobile robot and a positional relationship between a current position of the mobile robot and the cameras;

the second controlling process is a process of controlling the camera to be in operation and to be used as the information source from among the cameras in accordance with the scheduled traveling route of the mobile robot and a positional relationship between a current position of the mobile robot and the cameras; and the third controlling process is a process of controlling the camera to be in operation and to be used as the information source in a state where the camera is operated with a higher load than another camera from among the cameras in accordance with the scheduled traveling route of the mobile robot and a positional relationship between a current position of the mobile robot and the cameras.

3. The non-transitory storage medium according to claim 2, wherein:

the controlling process includes at least one of the first controlling process and the second controlling process;

the first controlling process is a process of controlling an imaging range of an image needed for traveling of the mobile robot in accordance with the scheduled traveling route and the positional relationship, and controlling the camera to be in operation from among the cameras based on the imaging range; and the second controlling process is a process of controlling an imaging range of an image needed for traveling of the mobile robot in accordance with the scheduled traveling route and the positional relationship, and controlling the camera to be in operation and to be used as the information source from among the cameras based on the imaging range.

4. The non-transitory storage medium according to claim 2, wherein:

the controlling process includes the third controlling process; and the third controlling process is a process of controlling an imaging range of an image needed for traveling of the mobile robot in accordance with the scheduled traveling route and the positional relationship, and controlling the camera to be in operation and to be used as the information source in a state where the camera is operated with a higher load than another camera from among the cameras based on the imaging range.

5. The non-transitory storage medium according to claim 2, wherein:

the controlling process is one process of the first controlling process, the second controlling process, and the third controlling process;

the first controlling process is a process of, in a case where the scheduled traveling route and the positional relationship indicate that the mobile robot is scheduled to enter a predetermined area corresponding to a blind spot area that is a blind spot for the mobile robot, controlling a camera disposed in the predetermined area among the cameras, as the camera to be in operation;

the second controlling process is a process of, in a case where the scheduled traveling route and the positional relationship indicate that the mobile robot is scheduled to enter a predetermined area corresponding to a blind spot area that is a blind spot for the mobile robot, controlling a camera disposed in the predetermined area among the cameras, as the camera to be in operation and to be used as the information source; and the third controlling process is a process of, in a case where the scheduled traveling route and the positional relationship indicate that the mobile robot is scheduled to enter a predetermined area corresponding to a blind spot area that is a blind spot for the mobile robot, controlling a camera disposed in the predetermined area among the cameras, as the camera to be in operation and to be used as the information source in a state where the camera is operated with a higher load than another camera.

\* \* \* \* \*